(12) United States Patent  
Yamada et al.

(10) Patent No.: US 9,732,648 B2
(45) Date of Patent: Aug. 15, 2017

(54) CATALYST DEVICE FOR EXHAUST GAS PURIFICATION AND METHOD FOR EXHAUST GAS PURIFICATION

(71) Applicant: MAZDA MOTOR CORPORATION, Hiroshima (JP)

(72) Inventors: Hiroshi Yamada, Hiroshima (JP); Masahiko Shigetsu, Higashihiroshima (JP); Hisaya Kawabata, Hiroshima (JP); Yasuhiro Matsumura, Hiroshima (JP); Kazuya Yokota, Hiroshima (JP); Toshihiko Ohsumi, Higashihiroshima (JP); Takeo Yamauchi, Aki-gun (JP); Yusuke Koike, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 111 days.

(21) Appl. No.: 14/430,763

(22) PCT Filed: Oct. 15, 2014

(86) PCT No.: PCT/JP2014/005229
§ 371 (c)(1),
(2) Date: Mar. 24, 2015

(87) PCT Pub. No.: WO2015/059904
PCT Pub. Date: Apr. 30, 2015

(65) Prior Publication Data
US 2016/0258330 A1    Sep. 8, 2016

(30) Foreign Application Priority Data

Oct. 23, 2013 (JP) .................................. 2013-220418
Jan. 23, 2014 (JP) .................................. 2014-010198

(Continued)

(51) Int. Cl.
*F01N 3/08* (2006.01)
*B01J 23/63* (2006.01)
(Continued)

(52) U.S. Cl.
CPC ....... *F01N 3/0814* (2013.01); *B01D 53/9468* (2013.01); *B01D 53/9486* (2013.01);
(Continued)

(58) Field of Classification Search
CPC .... F01N 3/0814; F01N 13/102; F01N 3/0835; F01N 2510/0864; B01D 53/9468; B01D 53/9486; B01D 2255/1021; B01D 2255/1023; B01D 2255/1025; B01D 2255/9025
See application file for complete search history.

(56) References Cited

U.S. PATENT DOCUMENTS 5,670,443 A    9/1997 Irite et al.
5,744,112 A    4/1998 Irite et al.
(Continued)

FOREIGN PATENT DOCUMENTS

CA    2466409 A1 * 11/2004 ........... B01D 53/944
CN    102387856 A    3/2012
(Continued)

OTHER PUBLICATIONS

JP 09220470 Machine Translation, Translated on Sep. 22, 2016.*
Machine Translation of JP 09220470, Translated Dec. 14, 2016.*

*Primary Examiner* — Patrick Maines
(74) *Attorney, Agent, or Firm* — Studebaker & Brackett PC

(57) ABSTRACT

An exhaust gas purification catalytic device 1 contains Pt, Pd, and Rh as catalytic metals. The catalytic metal Pt is loaded on silica-alumina which serves as a support, and Pt-loaded silica-alumina obtained by loading the Pt on the silica-alumina is contained in a catalytic layer with which an exhaust gas contacts first.

14 Claims, 16 Drawing Sheets

(30) Foreign Application Priority Data

Jan. 23, 2014 (JP) .................................. 2014-010199
Jan. 23, 2014 (JP) .................................. 2014-010200

(51) Int. Cl.

| | | |
|---|---|---|
| *B01J 29/74* | (2006.01) | |
| *B01J 35/02* | (2006.01) | |
| *B01J 37/02* | (2006.01) | |
| *F01N 3/10* | (2006.01) | |
| *F01N 3/28* | (2006.01) | |
| *B01D 53/94* | (2006.01) | |
| *F01N 13/10* | (2010.01) | |

(52) U.S. Cl.
CPC ............... *B01J 23/63* (2013.01); *B01J 29/74* (2013.01); *B01J 35/02* (2013.01); *B01J 37/02* (2013.01); *F01N 3/0835* (2013.01); *F01N 3/10* (2013.01); *F01N 3/28* (2013.01); *F01N 13/102* (2013.01); *B01D 2255/1021* (2013.01); *B01D 2255/1023* (2013.01); *B01D 2255/1025* (2013.01); *B01D 2255/2092* (2013.01); *B01D 2255/20707* (2013.01); *B01D 2255/30* (2013.01); *B01D 2255/90* (2013.01); *B01D 2255/9022* (2013.01); *B01D 2255/9025* (2013.01); *F01N 2510/0684* (2013.01)

(56) References Cited

U.S. PATENT DOCUMENTS

| | | | |
|---|---|---|---|
| 5,824,621 A | 10/1998 | Abe et al. | |
| 5,885,923 A | 3/1999 | Yoshida et al. | |
| 2004/0043897 A1* | 3/2004 | Tadao | B01D 53/9422 502/302 |
| 2004/0110628 A1* | 6/2004 | Kasahara | B01D 53/945 502/60 |
| 2008/0045404 A1* | 2/2008 | Han | B01D 53/945 502/66 |
| 2008/0045405 A1 | 2/2008 | Beutel et al. | |
| 2009/0257933 A1* | 10/2009 | Chen | B01D 53/945 423/213.2 |
| 2010/0257843 A1 | 10/2010 | Hoke et al. | |
| 2010/0290964 A1 | 11/2010 | Southward et al. | |
| 2012/0128557 A1* | 5/2012 | Nunan | B01D 53/945 423/213.5 |
| 2013/0189173 A1 | 7/2013 | Hilgendorff et al. | |
| 2015/0360213 A1* | 12/2015 | Bergeal | B01J 37/0244 60/301 |

FOREIGN PATENT DOCUMENTS

| | | | |
|---|---|---|---|
| CN | 102413904 A | | 4/2012 |
| CN | 102414412 A | | 4/2012 |
| EP | 0904827 A1 | | 3/1999 |
| JP | H05-309270 A | | 11/1993 |
| JP | H07-256114 A | | 10/1995 |
| JP | H07-275709 A | | 10/1995 |
| JP | H08-24583 A | | 1/1996 |
| JP | 09220470 A | * | 8/1997 |
| JP | H09-220470 A | | 8/1997 |
| JP | H11-104462 A | | 4/1999 |
| JP | 2001187344 A | * | 7/2001 |
| JP | 2005-081250 A | | 3/2005 |
| JP | 2012-523313 A | | 10/2012 |

* cited by examiner (a)

(b)

CATALYST DEVICE FOR EXHAUST GAS PURIFICATION AND METHOD FOR EXHAUST GAS PURIFICATION

TECHNICAL FIELD

The present invention relates to an exhaust gas purification catalytic device, and an exhaust gas purification method.

BACKGROUND ART

Trimetal catalysts containing platinum (Pt), palladium (Pd), and rhodium (Rh) as main catalytic metals have been used for purification of exhaust gas discharged from a gasoline engine. Proposed examples of the trimetal catalysts include a catalyst including these three catalytic metals mixed in a single catalytic layer, and a double-layer catalyst including Pd contained in a lower catalytic layer, Rh contained in an upper catalytic layer, and Pt contained in at least one of the lower and upper catalytic layers. In addition, various other types of catalysts have also been proposed. Examples of other catalysts include a catalyst on which those catalytic metals are separately loaded on an upstream side and a downstream side in the flowing direction of an exhaust gas, a catalyst on which different catalytic metal species are loaded at a center portion and a peripheral portion of a honeycomb substrate, and a catalyst on which a catalytic metal specie is loaded in different concentrations at the center and peripheral portions of the honeycomb substrate.

As a next-generation engine combustion technology, attention has recently been paid to homogeneous charge compression ignition (HCCI) combustion. In the HCCI combustion, gasoline in a combustion chamber is compressed to the point of auto-ignition and combusted in a lean atmosphere in accordance with an operation state of the engine. An operation range of the HCCI combustion is limited at present due to constraints on maximum cylinder pressure (Pmax) and a rate of increase in cylinder pressure (dP/dθ). Thus, an engine has been developed in which a combustion mode is switched with a low-load range of the engine regarded as an operation range for the HCCI combustion, and with a high-load range of the engine regarded as an operation range for spark ignition (SI) in which a fuel is ignited by an ignition plug as an assistant igniter. The result of the inventors' study on the composition of the exhaust gas generated by the HCCI combustion revealed that the exhaust gas contained a relatively large amount of saturated hydrocarbons having a carbon number of 5 (n-pentane, i-pentane) and CO. A possible cause of the fact is that the fuel, which is gasoline, is combusted at low temperature.

Such saturated hydrocarbons are also contained in the exhaust gas discharged from a general engine in which the fuel is combusted around stoichiometry, although the amount of the saturated hydrocarbons is not as large as the amount contained in the exhaust gas discharged from the engine performing the HCCI combustion. Thus, when the temperature of the exhaust gas discharged from the general gasoline engine is as low as the temperature of the exhaust gas discharged when the engine is started, the catalytic metals are not activated yet, and thus the saturated hydrocarbons are just discharged before being oxidized and purified sufficiently.

Patent Document 1 presents, as a catalyst for oxidizing the saturated hydrocarbons, a hydrocarbon combustion catalyst obtained by loading a platinum group metal on silica-alumina in which an atomic ratio of aluminum (Al)/silicon (Si) is 5-60. According to Patent Document 1, if Pd is loaded as a platinum group metal on the catalyst, the catalyst promotes combustion of propane ($C_3H_8$) which is one of those saturated hydrocarbons. Such a catalyst is suitably used in a high temperature combustor using catalytic combustion, such as boilers, jet engines for aircrafts, gas turbines for automobiles, and gas turbines for power generation.

CITATION LIST

Patent Document

[Patent Document 1] Japanese Unexamined Patent Publication No. H05-309270

SUMMARY OF THE INVENTION

Technical Problem

Although the catalyst of Patent Document 1 promotes the combustion of propane significantly as described above, it is not clear whether the catalyst can achieve efficient combustion of pentane ($C_5H_{12}$) which has a larger carbon number than propane, and is hardly combustible. Also, if an air-fuel ratio greatly varies according to the operation state, and the temperature of the catalyst is relatively low immediately after the start of the engine, as in the case of an engine for an automobile, the catalyst cannot fully exert its catalytic performance, and cannot easily purify the hydrocarbons. In particular, since the HCCI combustion occurs in a lean atmosphere, Pd used as the catalytic metal is maintained in an oxidized state, and the hydrocarbons cannot be combusted sufficiently. The exhaust gas contains not only those saturated hydrocarbons but also aromatic hydrocarbons and unsaturated hydrocarbons, and further contains CO and $NO_x$ (nitrogen oxide) in addition to those hydrocarbons. Thus, it is also important to efficiently purify these substances.

In view of these problems with the related art, the present invention was perfected for the purposes of performing efficient purification of those saturated hydrocarbons even in a gasoline engine which discharges a low-temperature exhaust gas, and performing efficient purification of various other components of the exhaust gas such as aromatic hydrocarbons and unsaturated hydrocarbons, not just the saturated hydrocarbons.

Solution to the Problem

To achieve these purposes, in an exhaust gas purification catalytic device according to the present invention, Pt is loaded as a catalytic metal on silica-alumina, and such Pt-loaded silica-alumina is introduced into a catalytic layer with which the exhaust gas discharged from the engine contacts first.

The exhaust gas purification catalytic device of the present invention is disposed in an exhaust gas passage of an engine and includes a plurality of catalytic layers to purify an exhaust gas discharged from the engine, wherein Pt is contained as a catalytic metal and is loaded on silica-alumina which serves as a support and in which alumina is modified by silicon, and Pt-loaded silica-alumina obtained by loading the Pt on the silica-alumina is contained in one of the plurality of catalytic layers with which the exhaust gas contacts first.

In the exhaust gas purification catalytic device of the present invention, silica-alumina is used as a support on which Pt is loaded. Silica-alumina has a large specific surface area, and improves the dispersibility of Pt to load. Further, silica-alumina has a small pore diameter, and therefore, a larger amount of Pt can be loaded not in the pores, but on a surface thereof. This increases the possibility of contact between Pt and the exhaust gas containing saturated hydrocarbons. Pt has high capability to oxidize and purify the saturated hydrocarbons. The increase in the possibility of contact between Pt and the exhaust gas containing the saturated hydrocarbons allows oxidation and purification of the saturated hydrocarbons with high efficiency. In particular, the Pt-loaded silica-alumina has outstandingly high capability to oxidize and purify the saturated hydrocarbons having a carbon number of 5 or more.

Since the Pt-loaded silica-alumina is contained in the catalytic layer with which the exhaust gas discharged from the engine contacts first, the temperature of the exhaust gas is increased by heat of reaction generated by the oxidation and purification of the saturated hydrocarbons having the carbon number of 5 or more using the catalytic layer. This enhances the catalytic activity of the catalytic layer with which the exhaust gas that has contacted with the former catalytic layer contacts next. In particular, the heat of reaction generated by the oxidation of the saturated hydrocarbons having a relatively large carbon number is greater than heat of reaction generated by oxidation of other exhaust gas components, such as CO and unsaturated hydrocarbons having a relatively small carbon number. Thus, the catalytic device of the present invention is advantageous in enhancing the catalytic activity of the catalytic layer.

In the exhaust gas purification catalytic device of the present invention, Rh and Pd are preferably contained as the catalytic metals in addition to Pt. Rh contributes to a steam reforming reaction which generates $H_2$, thereby accelerating reduction purification of $NO_x$, and further contributes to partial oxidation of HC such as saturated hydrocarbons, aromatic hydrocarbons, and unsaturated hydrocarbons, and CO. On the other hand, Pd has high capability to accelerate oxidation at a low temperature, and therefore, can oxidize highly efficiently HC and CO that have been partially oxidized by Rh. That is to say, the exhaust gas can be purified with high efficiency.

In the exhaust gas purification catalytic device of the present invention, the plurality of catalytic layers preferably form a stack, and the Pt-loaded silica-alumina is preferably contained in the uppermost one of the stack of catalytic layers with which the exhaust gas contacts first.

With this configuration, the Pt-loaded silica-alumina having high capability to oxidize and purify the saturated hydrocarbons is present in the uppermost catalytic layer. This increases the possibility of contact between the Pt-loaded silica-alumina and the saturated hydrocarbons, thereby allowing oxidation and purification of the saturated hydrocarbons with high efficiency. Since the uppermost catalytic layer can oxidize and purify the saturated hydrocarbons at a low temperature, the purification of other exhaust gas components by Rh or Pd contained in the lower catalytic layer is not inhibited by unpurified saturated hydrocarbons. Further, a lot of heat of reaction is generated as described above by oxidation and purification of the saturated hydrocarbons (among other things, saturated hydrocarbons having a relatively large carbon number such as $C_5H_{12}$), and the heat of reaction generated by the uppermost catalytic layer increases the temperature of the catalyst in the lower catalytic layer. Thus, the lower catalytic layer can exert its catalytic performance fully.

In the exhaust gas purification catalytic device of the present invention, it is preferable that the uppermost catalytic layer further contain Rh, and a catalytic layer of the stack which is located under the uppermost catalytic layer contain Pd.

Pd is slightly lower in heat resistance than Rh, and is easily alloyed with other catalytic metals when exposed to a high-temperature exhaust gas for a long time. Thus, good catalytic performance is achieved by loading Pd into the lower catalytic layer, and loading Rh into the upper catalytic layer spaced from the lower catalytic layer.

In the exhaust gas purification catalytic device of the present invention, it is preferable that the plurality of catalytic layers be a stack of three catalytic layers, a lowermost catalytic layer of the stack of three catalytic layers contain Pd, an intermediate catalytic layer of the stack of three catalytic layers contain Rh, and an uppermost catalytic layer of the stack of three catalytic layers contain the Pt-loaded silica-alumina.

With this configuration, the uppermost catalytic layer contains the Pt-loaded silica-alumina. Thus, as described above, the purification of the other exhaust gas components by Rh and Pd is not inhibited by unpurified saturated hydrocarbons. Further, since the intermediate catalytic layer containing Rh and the lowermost catalytic layer containing Pd are spaced from each other under the uppermost catalytic layer, exposure of Pd to a high temperature for a long time as described above can be prevented, thereby preventing Pd with Rh from forming an alloy.

In the exhaust gas purification catalytic device of the present invention, it is preferable that the Pt-loaded silica-alumina is also contained in at least one catalytic layer of the stack of catalytic layers other than the uppermost catalytic layer, and the uppermost catalytic layer is higher in content of the Pt-loaded silica-alumina than the at least one catalytic layer other than the uppermost catalytic layer.

With this configuration, the capability to purify the saturated hydrocarbons can be given not only to the uppermost catalytic layer, but also to the catalytic layer under the uppermost catalytic layer as well.

It is preferable that the exhaust gas purification catalytic device of the present invention further include a first catalyst, and a second catalyst disposed downstream of the first catalyst in a flowing direction of an exhaust gas and that the first catalyst include the catalytic layer with which the exhaust gas contacts first and the catalytic layer contain the Pt-loaded silica-alumina.

With this configuration, the first catalyst which is disposed at an upstream side of the exhaust gas passage closer to the engine and which contains the Pt-loaded silica-alumina can increase its temperature, and eventually its catalytic activity, earlier than the second catalyst disposed downstream of the first catalyst does. Thus, the saturated hydrocarbons having a relatively large carbon number, such as $C_5H_{12}$, can efficiently be oxidized and purified at a low temperature. Further, as described above, a lot of heat of reaction is generated by oxidation and purification of the saturated hydrocarbons (among other things, the saturated hydrocarbons having a relatively large carbon number, such as $C_5H_{12}$). For that reason, the heat of reaction generated by the first catalyst after the start of the oxidation reaction increases the temperature of the downstream second catalyst, thus allowing the second catalyst to exert its catalytic performance fully. This improves capability to purify not only the saturated hydrocarbons, but also HC such as aromatic hydrocarbons and unsaturated hydrocarbons, CO, and $NO_x$.

In the exhaust gas purification catalytic device of the present invention, it is preferable that the first catalyst further contain Pd.

With this configuration, the catalytic performance of the first catalyst is improved particularly significantly right after the engine has been started, because Pd has high capability to perform oxidation at a low temperature.

In the exhaust gas purification catalytic device of the present invention, the first and second catalysts are preferably spaced apart from each other.

With this configuration, thermal energy of the exhaust gas can be focused on the first catalyst, and therefore, an increase in the temperature of the first catalyst can be accelerated so much as to start the oxidation reaction much earlier. Further, the heat of reaction generated by the first catalyst leads to an accelerated increase in the temperature of the second catalyst, thus allowing the second catalyst to exert its catalytic performance efficiently.

It is preferable that the exhaust gas purification catalytic device of the present invention further include an HC trapping portion which is disposed downstream of the first catalyst in the flowing direction of the exhaust gas and which contains an HC trapping material and that the second catalyst be disposed downstream of the HC trapping portion in the flowing direction of the exhaust gas and include, as one of the plurality of catalytic layers, a catalytic layer containing Pd and Rh as catalytic metals, while the first catalyst contains neither Pd nor Rh.

With this configuration, when the temperature of the exhaust gas is still low right after the engine has been started, HC can be trapped by the HC trapping portion between the first and second catalysts. Thereafter, when the temperature of the exhaust gas rises, the trapped HC can be desorbed. Thus, if the second catalyst has not been sufficiently activated yet when the temperature of the exhaust gas is still low immediately after the engine has been started, the HC trapping portion traps the HC to reduce the amount of HC entering the second catalyst. Thereafter, when the temperature of the exhaust gas entering the HC trapping portion and the second catalyst rises, the HC is desorbed from the HC trapping portion, and the second catalyst is activated. As a result, the activated second catalyst can efficiently oxidize and purify the desorbed HC. The second catalyst contains Rh and Pd. Rh contributes to a steam reforming reaction which generates $H_2$, thereby accelerating reduction purification of $NO_x$, and further contributes to partial oxidation of HC such as saturated hydrocarbons, aromatic hydrocarbons, and unsaturated hydrocarbons, and CO. On the other hand, Pd has high capability to accelerate oxidation at a low temperature, and therefore, can oxidize highly efficiently HC and CO that have been partially oxidized by Rh. That is to say, the exhaust gas can be purified with high efficiency.

In the exhaust gas purification catalytic device of the present invention, it is preferable that the second catalyst include an HC trapping layer containing the HC trapping material and include, as one of the plurality of catalytic layers, a Pd/Rh-containing layer which contains Pd and Rh as the catalytic metals and which is located on the HC trapping layer.

With this configuration, when the temperature of the exhaust gas is low, HC can be trapped not only by the HC trapping portion, but also by the HC trapping layer of the second catalyst. Thus, HC can be desorbed after the temperature of the exhaust gas has risen, and the activated second catalyst can efficiently oxidize and purify HC.

In the exhaust gas purification catalytic device of the present invention, a heat insulating layer is preferably provided on the inner wall of at least one of the exhaust gas passage upstream of the first catalyst in the flowing direction of the exhaust gas and the exhaust gas passage between the first and second catalysts. The heat insulator can be provided at least by providing the exhaust gas passage with a double tube structure or by providing a heat insulating layer made of a low thermal conductor on the wall of the exhaust gas passage.

With this configuration, the exhaust gas discharged from the engine can be introduced into the first or second catalyst while maintaining the temperature of exhaust gas. This can efficiently improve their catalytic activities.

In the exhaust gas purification catalytic device of the present invention, the first catalyst is preferably disposed in an exhaust port of the engine, and the catalytic layer which contains the Pt-loaded silica-alumina and with which the exhaust gas contacts first is preferably formed on a metal substrate.

With this configuration, the Pt-loaded silica-alumina is contained in the first catalyst disposed in the exhaust port which is located closer to a combustion chamber of the engine. Thus, the temperature of the first catalyst, and eventually its catalytic activity, can be increased earlier. Therefore, the saturated hydrocarbons can efficiently be oxidized and purified.

In the exhaust gas purification catalytic device of the present invention, a heat insulator is preferably provided in the exhaust port upstream of the first catalyst in the flowing direction of the exhaust gas. This heat insulator can also be provided at least by providing the exhaust port with a double tube structure or by providing a heat insulating layer made of a low thermal conductor on a wall of the exhaust port.

With this configuration, the exhaust gas discharged from the engine can be introduced to the first catalyst while maintaining the temperature of the exhaust gas. This can efficiently enhance the catalytic activity of the first catalyst.

In the exhaust gas purification catalytic device of the present invention, it is preferable that the first catalyst using the metal substrate further contain Pd as the catalytic metal.

This configuration enhances the catalytic activity of the first catalyst immediately after the start of the engine, because the catalytic metal Pd exhibits high activity at a low temperature.

In the exhaust gas purification catalytic device including the first catalyst using the metal substrate, the second catalyst preferably contains Pd and Rh as the catalytic metals.

Rh contributes to a steam reforming reaction which generates $H_2$, thereby accelerating reduction purification of $NO_x$, and further contributes to partial oxidation of HC such as saturated hydrocarbons, aromatic hydrocarbons, and unsaturated hydrocarbons, and CO. On the other hand, Pd has high capability to accelerate oxidation at a low temperature, and therefore, can oxidize highly efficiently HC and CO that have been partially oxidized by Rh.

An exhaust gas purification method of the present invention is a method for purifying an exhaust gas discharged from an engine. The method includes: disposing a first catalytic layer containing Pt-loaded silica-alumina obtained by loading Pt on silica-alumina in which alumina is modified by silicon such that the exhaust gas contacts with the first catalytic layer first, and disposing a second catalytic layer containing Pd or Rh such that the exhaust gas that has contacted with the first catalytic layer contacts with the second catalytic layer next; oxidizing and purifying a saturated hydrocarbon having a carbon number of 5 or more in the exhaust gas using the first catalytic layer, and increasing a temperature of the exhaust gas entering the second catalytic layer by heat of reaction generated by the oxidation and purification; and oxidizing and purifying a hydrocarbon other than the saturated hydrocarbon having the carbon number of 5 or more using the second catalytic layer that has been activated by an increase in the temperature of the exhaust gas.

As described above, a lot of heat of reaction is generated by oxidation and purification of the saturated hydrocarbons (among other things, saturated hydrocarbons having a carbon number of 5 or more, such as $C_5H_{12}$). Thus, according to the exhaust gas purification method of the present invention, heat of reaction is generated by the first catalytic layer which contains the Pt-loaded silica-alumina and which is disposed such that the exhaust gas contacts with the first catalytic layer first. The heat of reaction increases the temperature of the second catalytic layer disposed such that the exhaust gas that has contacted with the first catalytic layer contacts with the second catalyst next, and allows the second catalytic layer to exert its catalytic performance fully. As a result, the exhaust gas components can be purified efficiently.

Preferably, the exhaust gas purification method of the present invention further includes: disposing an HC trapping portion containing an HC trapping material between the first and second catalytic layers; making the HC trapping portion trap the hydrocarbon in the exhaust gas discharged from the engine that has just been started; making the first catalytic layer oxidize and purify the saturated hydrocarbon having the carbon number of 5 or more in the exhaust gas discharged from the engine since the engine was started, and causing an increase in the temperature of the exhaust gas entering the HC trapping portion and the second catalytic layer by heat of reaction generated by the oxidation and purification; desorbing the trapped hydrocarbon by utilizing the increase in the temperature of the exhaust gas entering the HC trapping portion; and activating the second catalytic layer by utilizing the increase in the temperature of the exhaust gas entering the second catalytic layer, and making the second catalytic layer oxidize and purify the hydrocarbon desorbed from the HC trapping portion.

With this configuration, the HC trapping portion traps HC in the exhaust gas discharged from the engine that has just been started. Thus, when the temperature of the exhaust gas has not risen yet and when the catalytic activity is not exerted fully yet, unpurified HC can be prevented from being discharged out of the chamber. When the temperature of the exhaust gas rises after that, HC can be desorbed and oxidized and purified by the downstream second catalyst.

In the exhaust gas purification catalytic device and purification method of the present invention, the engine is preferably capable of performing HCCI combustion.

As described above, the exhaust gas generated by the HCCI combustion contains a lot of saturated hydrocarbons having a carbon number of 5 (including n-pentane and i-pentane). Thus, the exhaust gas can be purified with high efficiency by applying the exhaust gas purification catalytic device of the present invention having high capability to purify the saturated hydrocarbons to the engine capable of performing the HCCI combustion.

Advantages of the Invention

According to the exhaust gas purification catalytic device and purification method of the present invention, silica-alumina is used as a support on which Pt is to be loaded, and therefore, the possibility of contact between Pt and the exhaust gas containing the saturated hydrocarbons can be increased. This allows oxidation and purification of the saturated hydrocarbons with high efficiency. Further, since Pt-loaded silica-alumina is contained in the catalytic layer with which the exhaust gas contacts first, the heat of reaction generated by the oxidation and purification of the saturated hydrocarbons enhances the catalytic activity of the catalytic layer with which the exhaust gas contacts next.

DESCRIPTION OF EMBODIMENTS

Embodiments of the present invention will now be described with reference to the drawings. Preferred embodiments to be described below are merely illustrative ones in nature, and do not intend to limit scope of the present invention or applications or uses thereof.

An engine in the context of the present invention is not limited to a general engine which performs spark ignition (SI) combustion in which a fuel is ignited by an ignition plug as an assistant igniter. The engine may be an engine in which a combustion mode is switched with a low-load range of the engine regarded as an operation range for homogeneous charge compression ignition (HCCI) combustion, and with a high-load range of the engine regarded as an operation range for the spark ignition (SI) in which the fuel is ignited by the ignition plug. Alternatively, the engine may also be an engine which performs the HCCI combustion in the whole range from the low- through high-load range.

First Embodiment

Figure 1:
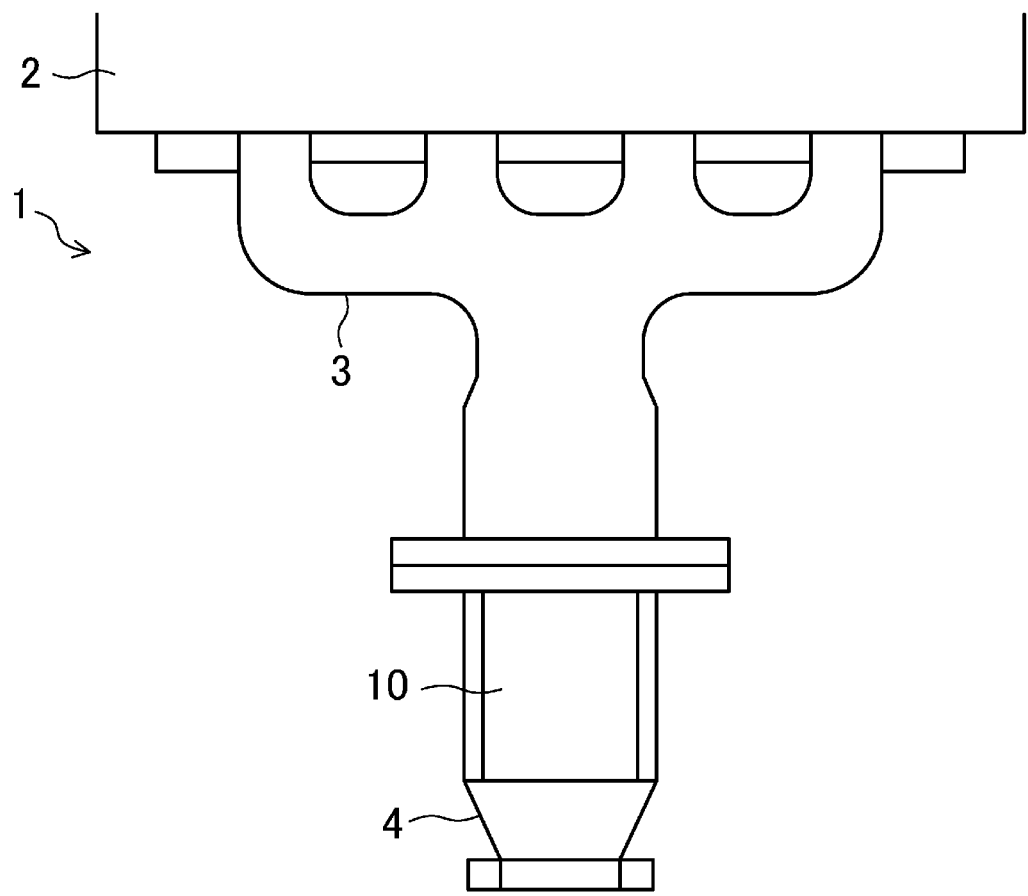
FIG. 1 is a schematic view showing a configuration for an exhaust gas purification catalytic device according to a first embodiment of the present invention.

FIG. 1 shows a configuration of an exhaust gas purification catalytic device 1 as a first embodiment of the present invention. In FIG. 1, the reference number 2 denotes a cylinder head of a four-cylinder gasoline engine, the reference number 3 denotes an exhaust manifold connected to an exhaust port of the engine, the reference number 4 denotes an exhaust pipe connected to a downstream end of the exhaust manifold in the flowing direction of an exhaust gas, and the reference number 10 indicates a catalyst provided in the exhaust pipe. In this embodiment, the catalyst 10 is provided in the exhaust pipe 4. However, the catalyst 10 does not have to be provided there but may be provided in the exhaust manifold 3 instead.

Figure 2:
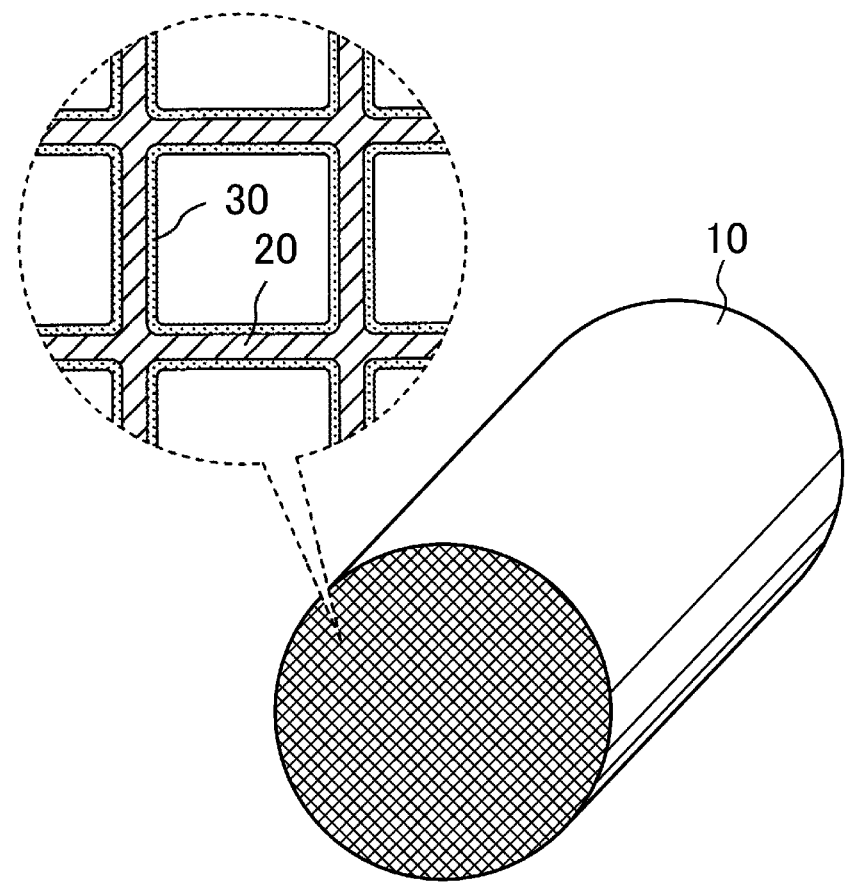
FIG. 2 shows a catalyst of the exhaust gas purification catalytic device in a perspective view and a partial enlargement view.

FIG. 2 shows a configuration for the catalyst 10. The catalyst 10 includes a stacked catalyst 30 disposed on the wall of an exhaust gas passage for a honeycomb substrate 20 made of cordierite.

<Configuration of Catalytic Layer>

In this embodiment, the stacked catalyst 30 includes a plurality of catalytic layers which are stacked one upon the other. The structure of the catalytic layers will be described below with reference to FIG. 3.

Figure 3:
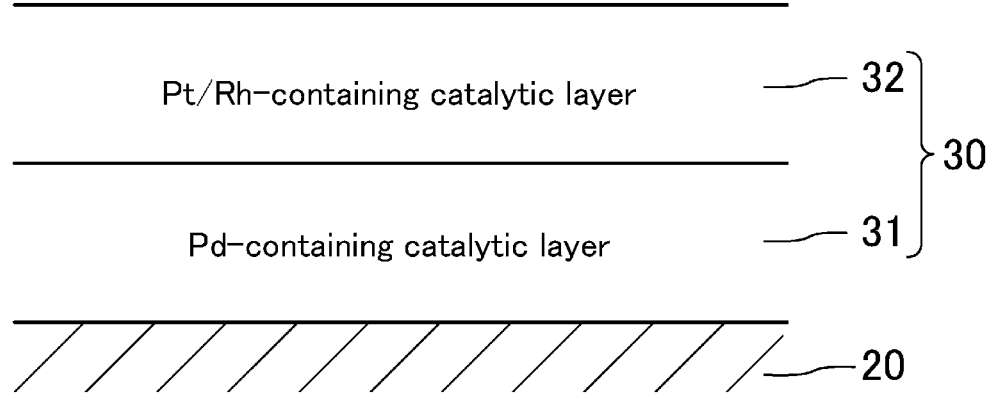
FIG. 3 is a cross-sectional view showing a configuration for a catalytic layer with a double-layer structure of the exhaust gas purification catalytic device.

As shown in FIG. 3, the stacked catalyst 30 of the present embodiment includes a Pd-containing catalytic layer (a lower catalytic layer) 31 formed on the wall of the exhaust gas passage of the honeycomb substrate 20 (a base), and a Pt/Rh-containing catalytic layer (an upper catalytic layer) 32 formed on the Pd-containing catalytic layer 31, i.e., on a surface of the Pd-containing catalytic layer 31 facing the exhaust gas passage, such that the exhaust gas discharged from the engine contacts with the Pt/Rh-containing catalytic layer 32 first.

The Pd-containing catalytic layer 31 contains Pd which is loaded as a catalytic metal on a support. For example, the Pd-containing catalytic layer 31 contains Pd-loaded alumina obtained by loading Pd on activated alumina (γ-alumina), and a Pd-loaded ZrCe-based composite oxide obtained by loading Pd on a ZrCe-based composite oxide containing Zr and Ce. The Pd-containing catalytic layer 31 may further contain an OSC material having oxygen storage/release capability (OSC), such as ceria. The Pd-containing catalytic layer 31 contains a binder, which may be made of zirconyl nitrate, for example.

The Pt/Rh-containing catalytic layer 32 contains Pt-loaded silica-alumina obtained by loading Pt on silica-alumina. The Pt/Rh-containing catalytic layer 32 contains Rh which is loaded as a catalytic metal on a support. The Pt/Rh-containing catalytic layer 32 contains, for example, Rh-loaded alumina obtained by loading Rh on activated alumina (γ-alumina), and an Rh-loaded ZrCe-based composite oxide obtained by loading Rh on a ZrCe-based composite oxide containing Zr and Ce. The Pt/Rh-containing catalytic layer 32 also contains a binder, which may be made of zirconyl nitrate, for example.

Although the stacked catalyst 30 shown in FIG. 3 has a double-layer structure, this is only an example and the stacked catalyst 30 may also be comprised of three layers. A stacked catalyst 35 with a triple-layer structure will be described with reference to FIG. 4.

Figure 4:
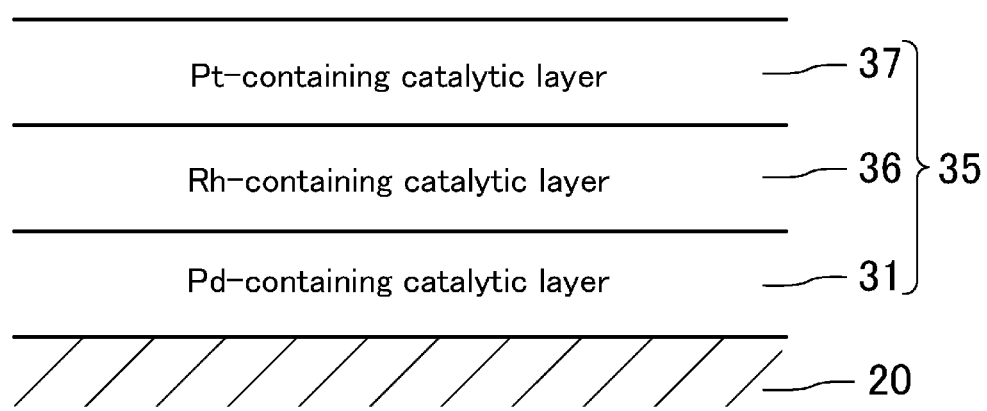
FIG. 4 is a cross-sectional view showing a configuration for a catalytic layer with a triple-layer structure of the exhaust gas purification catalytic device.

As shown in FIG. 4, this stacked catalyst 35 with a triple-layer structure includes a Pd-containing catalytic layer (a lower catalytic layer) 31 formed on a wall of an exhaust gas passage of a honeycomb substrate (a base) 20, an Rh-containing catalytic layer (an intermediate catalytic layer) 36 stacked on the Pd-containing catalytic layer 31, and a Pt-containing catalytic layer (an uppermost catalytic layer) 37 stacked on the Rh-containing catalytic layer 36. Specifically, the stacked catalyst 35 with this triple-layer structure is different from the stacked catalyst 30 of FIG. 3 in that the Pt/Rh-containing catalytic layer 32 is divided into the Rh-containing catalytic layer 36 as the intermediate catalytic layer and the Pt-containing catalytic layer 37 as the uppermost catalytic layer. The Rh-containing catalytic layer 36 contains Rh which is loaded on a support such as the Rh-loaded alumina and the Rh-loaded ZrCe-based composite oxide. Meanwhile, the Pt-containing catalytic layer 37 contains the Pt-loaded silica-alumina.

In the stacked catalyst 30 with the double-layer structure of FIG. 3 and the stacked catalyst 35 with the triple-layer structure of FIG. 4, the lower catalytic layer and the intermediate catalytic layer other than the uppermost catalytic layer may also contain the Pt-loaded silica-alumina. In that case, however, the uppermost catalytic layer preferably contains a larger amount of the Pt-loaded silica-alumina than any other layer of the stack.

<Method for Preparing Catalytic Material>

A method for preparing catalytic materials contained in these catalytic layers will be described below.

First, a method for preparing the Pd-loaded ZrCe-based composite oxide contained in the Pd-containing catalytic layer will be described. Here, a ZrCeNd composite oxide is used as the ZrCe-based composite oxide. The ZrCeNd composite oxide can be prepared by coprecipitation. Specifically, with a nitrate solution prepared by mixing cerium (III) nitrate hexahydrate, a zirconium oxynitrate solution, neodymium nitrate hexahydrate, and ion exchanged water, an 8-fold dilution of 28 mass % ammonia water is mixed to neutralize the nitrate solution, thereby obtaining a coprecipitate. The solution containing the coprecipitate is then centrifuged using a centrifugal separator to remove a supernatant (dehydration), and ion exchanged water is added thereto to stir the mixture (washing with water). These processes are repeatedly performed a required number of times. Then, the precipitate is left in the air, dried at about 150° C. for 24 hours, pulverized, and then baked in the air at about 500° C. for 2 hours. Thus, a CeZrNd composite oxide powder is obtained. Pd can be loaded on the ZrCeNd composite oxide powder thus obtained by adding a palladium nitrate aqueous solution to the ZrCeNd composite oxide powder and evaporating the mixture to dryness.

The evaporation to dryness process may be performed in the following manner. First, ion exchanged water is added to particles of ZrNdPr composite oxide to prepare slurry, which is then sufficiently stirred with a stirrer or any other suitable tool. Then, while stirring the slurry, a predetermined amount of dinitro diamine palladium nitrate solution is dripped to the slurry, and the mixture is sufficiently stirred. Then, the product thus obtained is further stirred under heat to completely vaporize the water. After the evaporation, the product thus obtained is baked in the air at about 500° C. for 2 hours to obtain a Pd-loaded ZrCeNd composite oxide. To this ZrCe-based composite oxide, a rare-earth metal such as La or Y may be added in addition to Nd.

Next, a method for preparing the Pd-loaded alumina will be described. In the present embodiment, La-containing alumina containing 4 mass % of $La_2O_3$, for example, may be used as alumina to increase thermal stability. The Pd-loaded alumina can be obtained by adding a dinitro diamine palladium nitrate solution to the La-containing alumina and evaporating the mixture to dryness in the same manner as described above.

To the Pd-loaded ZrCeNd composite oxide and Pd-loaded alumina thus obtained, and the OSC material such as ceria and the ZrCeNd composite oxide, a binder such as zirconyl nitrate and ion exchanged water are added and mixed to prepare slurry. The slurry is applied on a substrate, dried at about 150° C., and then baked at about 500° C. for 2 hours to form a Pd-containing catalytic layer on the substrate.

Next, a method for preparing an Rh-containing catalytic component contained in the Pt/Rh-containing catalytic layer or the Rh-containing catalytic layer will be described. First, it will be described how to prepare an Rh-loaded ZrCeNd composite oxide as the Rh-loaded ZrCe-based composite oxide. The Rh-loaded ZrCeNd composite oxide is obtained by adding a rhodium nitrate aqueous solution to the ZrCeNd composite oxide prepared as described above, and evaporating the mixture to dryness in the same manner as described above.

Likewise, Rh-loaded alumina is also obtained by adding a rhodium nitrate aqueous solution to alumina and evaporating the mixture to dryness. In the present embodiment, the La-containing alumina described above, or Zr/La-containing alumina obtained by loading a Zr-based composite oxide containing Zr on La-containing alumina may be used as alumina.

Next, a method for preparing a Pt-containing catalytic component contained in the Pt/Rh-containing catalytic layer or the Pt-containing catalytic layer will be described. First, it will be described how to prepare silica-alumina on which Pt is to be loaded. A predetermined amount of aluminum alkoxide and a predetermined amount of silicon alkoxide are suspended in glycol, and the suspension thus obtained is thermally treated in an inert gas atmosphere such as nitrogen at about 200-400° C. for about 2 hours. Then, the reactant thus obtained is washed with methanol or any other suitable solvent, dried, and then baked at about 500-1500° C. for 2 hours. In this manner, silica-alumina can be obtained. Pt-loaded silica-alumina can be obtained by adding a dinitro diamine platinum nitrate solution to the silica-alumina thus obtained and evaporating the mixture to dryness. Alternatively, silica-alumina may be obtained by sol-gel process, and Pt may be loaded on the silica-alumina thus obtained by the evaporation to dryness method.

In the case of preparing a stacked catalyst with a double-layer structure, a binder material such as zirconyl nitrate and ion exchanged water are added to the Rh-containing catalytic component and Pt-loaded silica-alumina obtained in the above-described manner, and mixed to form slurry. The slurry is then applied on the Pd-containing catalytic layer, dried at about 150° C., and then baked at about 500° C. for 2 hours. In this manner, the Pt/Rh-containing catalytic layer can be formed on the Pd-containing catalytic layer.

On the other hand, in preparing a stacked catalyst with a triple-layer structure, a binder material such as zirconyl nitrate and ion exchanged water are added to the Rh-containing catalytic component obtained in the above-described manner to prepare slurry, which is then applied, dried, and baked as described above to form an Rh-containing catalytic layer on the Pd-containing catalytic layer. Then, a binder material such as zirconyl nitrate and ion exchanged water are added to the Pt-loaded silica-alumina, and the slurry thus obtained is applied on the Rh-containing catalytic layer, dried, and baked just as described above to form a Pt-containing catalytic layer on the Rh-containing catalytic layer. In this manner, the catalyst of the present embodiment can be obtained.

<Silica-Alumina>

Figure 5:
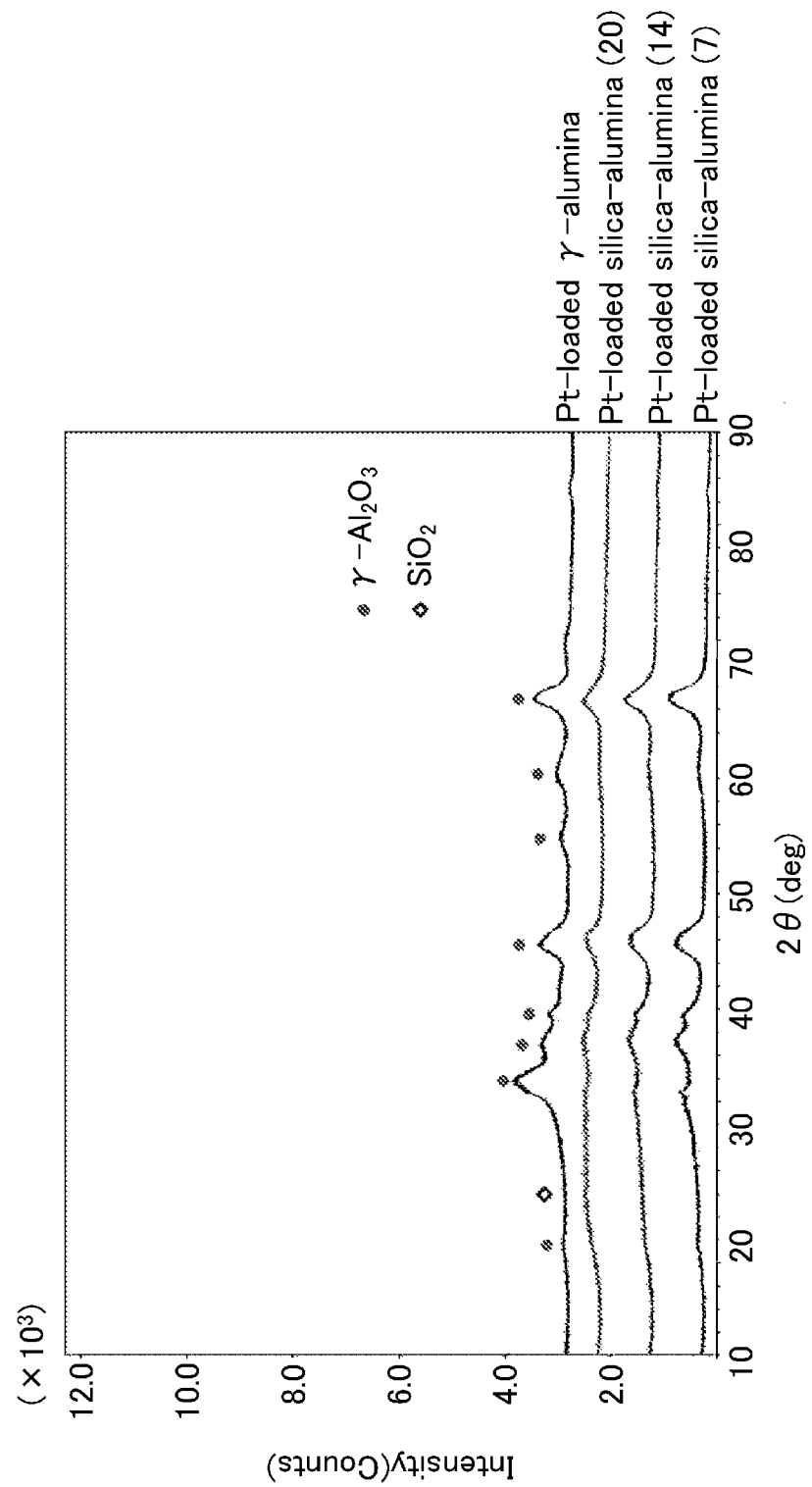
FIG. 5 is a graph showing the results of X-ray diffraction (XRD) analysis performed on Pt-loaded silica-alumina and Pt-loaded γ-alumina.

In the present embodiment, silica-alumina is used, in place of activated alumina (γ-alumina) generally used, as a support on which Pt is to be loaded. The silica-alumina used in the present embodiment is neither a simple mixture of $SiO_2$ and $Al_2O_3$ nor zeolite having a particular pore diameter of around 10 Å, as represented by ZSM-5, but is $Al_2O_3$ modified with Si, and is a composite oxide in which a Si atom and an Al atom are bonded via an O atom. Here, an X-ray diffraction (XRD) analysis was performed on the Pt-loaded silica-alumina used in the present embodiment and Pt-loaded γ-alumina obtained by loading Pt on the ordinary γ-alumina. FIG. 5 shows the results of the diffraction analysis of their crystal structures.

As shown in FIG. 5, the Pt-loaded γ-alumina showed several peaks derived from γ-alumina (indicated by •). Naturally, the Pt-loaded γ-alumina did not show any peaks derived from $SiO_2$ (indicated by ◇). On the other hand, the Pt-loaded silica-alumina also showed several outstanding peaks derived from γ-alumina, and did not show any peaks derived from $SiO_2$. Specifically, the silica-alumina should not have the $SiO_2$ crystal structure, and would be in the state of a composite oxide in which a Si atom is bonded to an O atom in the $Al_2O_3$ crystal structure, and the Si atom and an Al atom are bonded via the O atom such that the Si and Al atoms share the O atom.

In FIG. 5, the Pt-loaded silica-alumina (20) contains 20 wt % of $SiO_2$ in silica-alumina. Likewise, the Pt-loaded silica-alumina (14) contains 14 wt % of $SiO_2$ in silica-alumina, and the Pt-loaded silica-alumina (7) contains 7 wt % of $SiO_2$ in silica-alumina. However, as described above, silica-alumina contains the O atom shared by the Si and Al atoms. For example, suppose that the Pt-loaded silica-alumina (20) contains 20 wt % of $SiO_2$ including the O atom shared with the Al atom. When these Pt-loaded silica-aluminas (20, 14 and 7) were compared to each other, there was no significant difference between them. In the present invention, the amount of $SiO_2$ to be loaded into the silica-alumina is not particularly limited. However, the amount of $SiO_2$ is preferably less than 30 wt %, more preferably 20 wt %, because an $SiO_2$ content of about 30 wt % will isolate a $SiO_2$ crystal phase, which may decrease the specific surface area.

Next, it will be described what advantages are achieved by using such silica-alumina as a support on which Pt is to be loaded.

Figure 6:
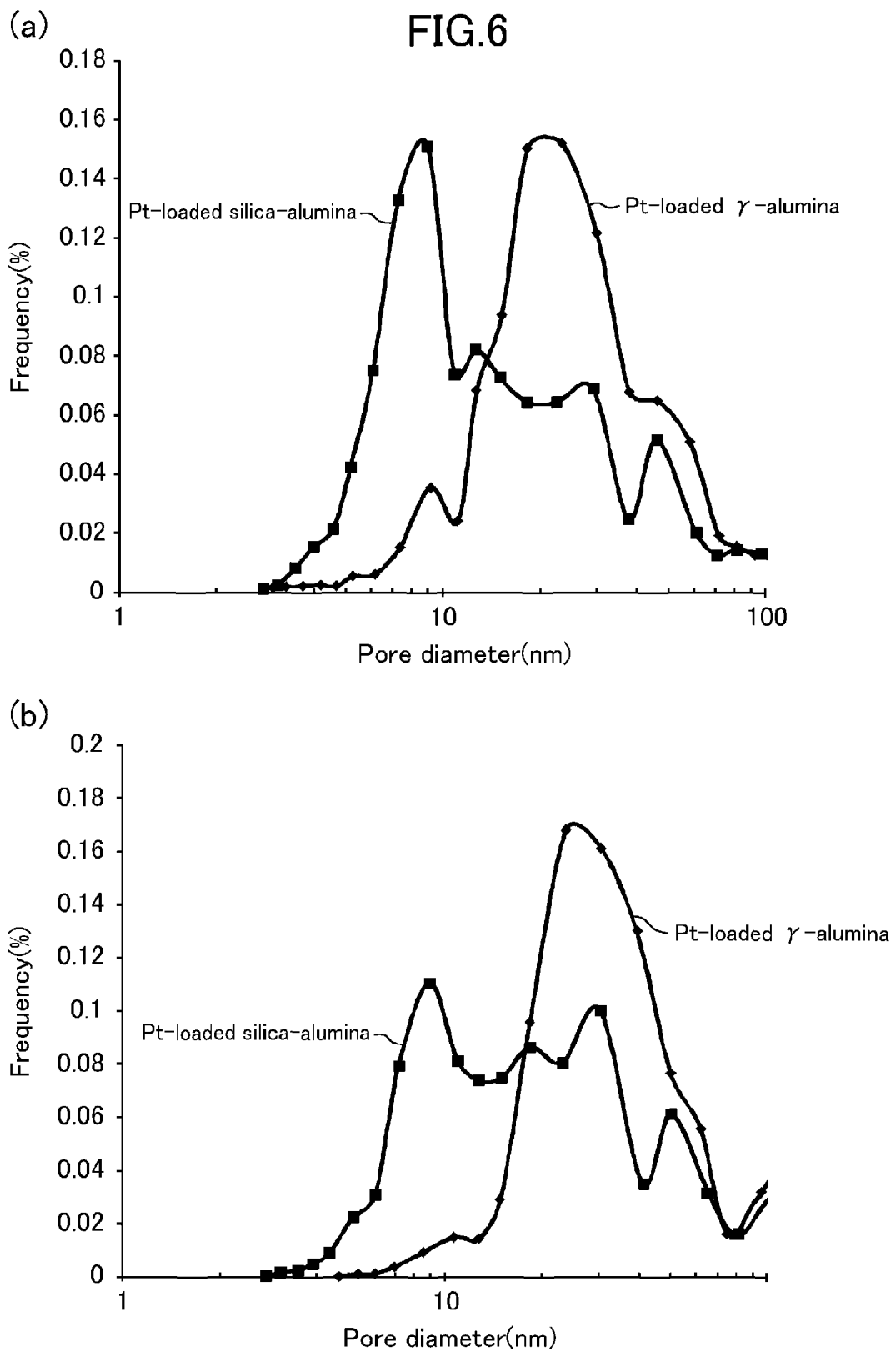
FIG. 6(a) is a graph showing pore size distributions of Pt-loaded silica-alumina and Pt-loaded γ-alumina, both of which are not aged.
FIG. 6(b) is a graph showing pore size distributions of Pt-loaded silica-alumina and Pt-loaded γ-alumina, both of which are aged.

First, pore size distributions and specific surface areas were measured on the Pt-loaded silica-alumina and Pt-loaded, silica-free γ-alumina and the results of measurements were compared to each other. Here, the pore size distributions and the specific surface areas were measured on the Pt-loaded silica-alumina obtained by loading 0.5 wt % of Pt on silica-alumina containing 20 wt % of $SiO_2$, and on Pt-loaded γ-alumina obtained by loading Pt on silica-free γ-alumina. The pore size distributions and the specific surface areas were also measured on samples of the Pt-loaded silica-alumina and the Pt-loaded γ-alumina which were aged in a $N_2$ gas atmosphere with 2% of $O_2$ and 10% of $H_2O$ at 1000° C. for 24 hours, and samples which were not aged. FIGS. 6(a) and 6(b) show the results of the measurement of the pore size distributions. FIG. 6(a) shows the results of the non-aged samples, and FIG. 6(b) shows the results of the aged samples. Table 1 shows the results of the measurement of the specific surface areas.

TABLE 1

|  | Non-aged (m²/g) | Aged (m²/g) |
| --- | --- | --- |
| Pt-loaded γ-alumina | 177.3 | 108.8 |
| Pt-loaded silica-alumina | 289.1 | 205.7 |

As shown in FIGS. 6(a) and 6(b), both of the aged and non-aged samples of the Pt-loaded silica-alumina have the highest peaks at a pore size of less than 10 nm, while the aged and non-aged samples of the Pt-loaded γ-alumina have the highest peaks at a pore size of around 20 nm to 30 nm. Specifically, the Pt-loaded silica-alumina has the smaller pore diameter than the Pt-loaded γ-alumina. In the present embodiment, Pt is loaded on a support by performing an evaporation to dryness process using the dinitro diamine platinum nitrate solution as described above. In this case, the Pt loaded has a particle diameter of about 10 nm. Thus, in the Pt-loaded γ-alumina, a huge number of Pt particles are loaded into the pores. In the Pt-loaded silica-alumina, on the other hand, a larger number of the Pt particles are loaded on the surface of the silica-alumina rather than in the pores. For this reason, with use of the Pt-loaded silica-alumina, a larger amount of Pt will be present on the surface of the silica-alumina, thus increasing the possibility of contact between Pt and the exhaust gas. This suggests that the saturated hydrocarbons in the exhaust gas will be combusted with high efficiency.

As shown in Table 1, in both of the aged and non-aged samples, the Pt-loaded silica-alumina has a larger surface specific area than the Pt-loaded γ-alumina. Thus, the dispersibility of Pt can be increased more significantly by loading Pt on the silica-alumina. That is to say, this suggests that use of the Pt-loaded silica-alumina can increase the possibility of contact between Pt and the exhaust gas and that the saturated hydrocarbons in the exhaust gas can be combusted with high efficiency.

Next, capabilities of the Pt-loaded silica-alumina and the Pt-loaded γ-alumina to combust pentane ($C_5H_{12}$) were measured and compared. The following test was carried out to measure the capabilities of the Pt-loaded silica-alumina and the Pt-loaded γ-alumina to combust pentane.

Hexagonal cell honeycomb substrates (with a diameter of 25.4 mm and a length of 50 mm), each of which was made of cordierite, and had a cell wall thickness of 3.5 mil, 600 cells per square inch, and a substrate capacity of 25 ml, were used as substrates, and the Pt-loaded silica-alumina and the Pt-loaded γ-alumina were provided on the substrates, respectively. Specifically, to each of the Pt-loaded silica-alumina and the Pt-loaded γ-alumina, ion exchanged water and a binder were added to prepare slurry, which was then applied on the substrate, dried, and baked to provide each of the substances on the substrate. The silica-alumina and the γ-alumina used as the supports were provided on the substrates in an amount of 100 g/L (which is the amount per L of the substrate; the same goes for the rest of the description), and 0.5 g/L of Pt was loaded thereon. The weight ratio of $SiO_2$ to $Al_2O_3$ in the silica-alumina was set to be $SiO_2$:$Al_2O_3$=20:80. The honeycomb catalysts thus obtained were aged in the same gas atmosphere as the one employed in the measurement of the pore size distribution described above at 900° C. for 50 hours. Thereafter, a $C_5H_{12}$ purification rate was measured.

Figure 7:
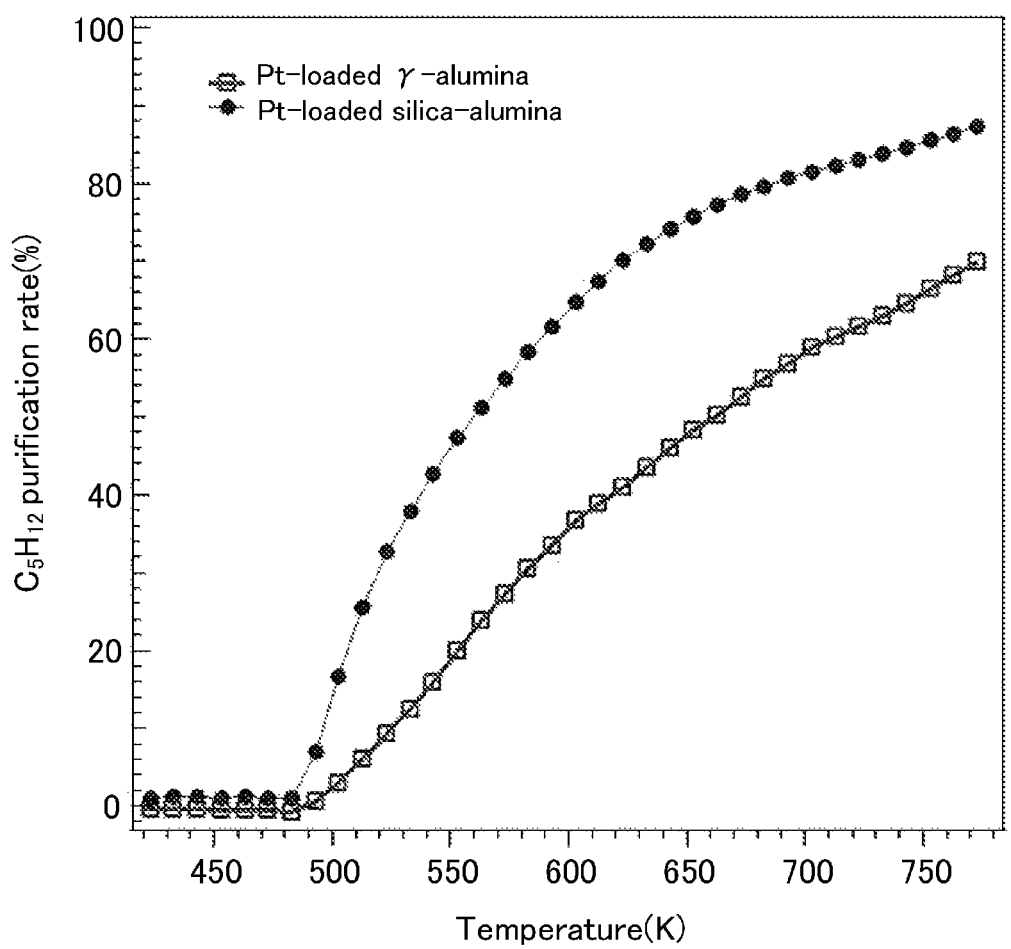
FIG. 7 is a graph showing $C_5H_{12}$ purification capabilities of Pt-loaded silica-alumina and Pt-loaded γ-alumina.

For this measurement, first, each of the honeycomb catalysts thus prepared was loaded into a model gas flow reactor, and a model gas containing pentane (isopentane) was introduced there. The model gas was composed of 3000 ppmC of isopentane (i-$C_5H_{12}$), 1700 ppm of CO, 10.5% of $O_2$, 13.9% of $CO_2$, 10% of $H_2O$, and $N_2$ as the balance. The flow rate of the gas was set to be 26.1 L/min (corresponding to a space velocity SV=63000 $h^{-1}$). The temperature of the model exhaust gas entering the catalyst was gradually increased from normal temperature to detect a variation in the $C_5H_{12}$ concentration of the gas emitted out of the catalyst, on which the $C_5H_{12}$ purification rate of each of the honeycomb catalysts was measured. FIG. 7 shows the results of the measurement.

As shown in FIG. 7, when the gas temperature increased to reach the vicinity of 500K, the Pt-loaded silica-alumina showed a higher $C_5H_{12}$ purification rate than the Pt-loaded γ-alumina. The Pt-loaded silica-alumina continued to have the higher $C_5H_{12}$ purification rate than the other alumina until the temperature reached the vicinity of 750K. This result suggests that loading Pt on the silica-alumina would allow purification of the saturated hydrocarbons such as pentane with higher efficiency.

To study the relation between weight ratio and catalytic performance of silica ($SiO_2$) and alumina ($Al_2O_3$) in the Pt-loaded silica-alumina, the $C_5H_{12}$ purification rate was measured with their weight ratio changed. Here, light-off temperature (T50) was measured as an index to $C_5H_{12}$ purification capability. The light-off temperature (T50) is the temperature of the gas entering the catalyst at which the $C_5H_{12}$ purification rate reaches 50% while the temperature of the model gas introduced into the catalyst is gradually increased from normal temperature. The model gas had the same composition as in the test described above. In the Pt-loaded silica-alumina, the weight ratio of $SiO_2$ was set to be 20 wt %, 10 wt %, or 5 wt %. In addition to these three types of Pt-loaded silica-aluminas, the $C_5H_{12}$ purification rate (T50) was measured also on the Pt-loaded silica obtained by loading Pt on silica, in place of silica-alumina. The following Table 2 shows the results of the measurements.

TABLE 2

| Catalyst composition | i-$C_5H_{12}$ (T50/° C.) |
| --- | --- |
| Pt-loaded silica-alumina, $SiO_2$ = 20 wt % | 285° C. |
| Pt-loaded silica-alumina, $SiO_2$ = 10 wt % | 307° C. |

TABLE 2-continued

| Catalyst composition | i-C$_5$H$_{12}$ (T50/° C.) |
|---|---|
| Pt-loaded silica-alumina, SiO$_2$ = 5 wt % | 313° C. |
| Pt-loaded silica | 392° C. |

As shown in Table 2, the highest H$_5$C$_{12}$ purification capability was obtained when the SiO$_2$ content in the silica-alumina was set to be 20 wt %, and the purification capability declined as the SiO$_2$ content was decreased. When Pt was loaded on silica, in place of silica-alumina, the H$_5$C$_{12}$ purification capability apparently declined compared to the Pt-loaded silica-alumina. This indicates that use of the silica-alumina as the support on which Pt is to be loaded allows purification of H$_5$C$_{12}$ with high efficiency.

As can be seen from the foregoing description, according to the catalyst of the present embodiment as shown in FIG. 3 or FIG. 4, the Pt/Rh-containing catalytic layer 32 or the Pt-containing catalytic layer 37 is provided as the upper catalytic layer of the stacked catalyst 30 or 35. The silica-alumina contained therein has a large specific surface area, which increases the dispersibility of the Pt loaded, and has a small pore diameter, which allows loading of a lot more Pt on the surface of the catalyst rather than in the pores. Further, since the Pt/Rh-containing catalytic layer 32 and the Pt-containing catalytic layer 37 are each disposed as the uppermost catalytic layer, the possibility of contact between Pt and the exhaust gas containing the saturated hydrocarbons can be increased. Pt has high capability to oxidize and purify the saturated hydrocarbons. Thus, an increase in the possibility of contact between that Pt and the exhaust gas containing the saturated hydrocarbons allows oxidation and purification of the saturated hydrocarbons with high efficiency. Since the Pt/Rh-containing catalytic layer 32 and the Pt-containing catalytic layer 37 are each disposed as the uppermost catalytic layer (i.e., arranged such that the exhaust gas contacts with each of these layers first), the heat of reaction generated by oxidation of H$_5$C$_{12}$ or any other substance propagates to the lower catalytic layer, thus enhancing the catalytic activity of the lower catalytic layer.

Second Embodiment

Next, an exhaust gas purification catalytic device according to a second embodiment of the present invention will be described. In the following description of this second embodiment, any members that are identical to the counterparts of the first embodiment described above will be identified by the same reference characters as their counterparts', and will not be described in detail all over again. Instead, the following description will be focused on only the difference between this and that embodiments.

Figure 8:
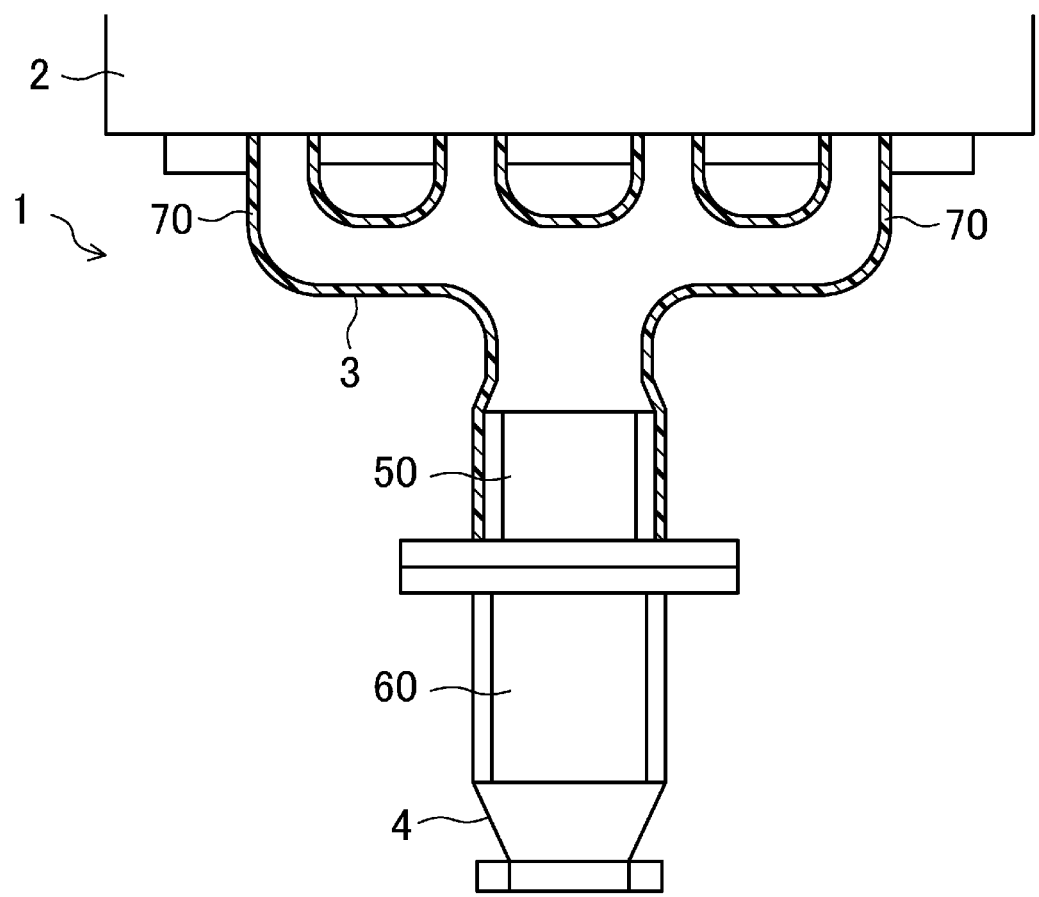
FIG. 8 is a schematic view showing a configuration for an exhaust gas purification catalytic device according to a second embodiment of the present invention.

As shown in FIG. 8, the exhaust gas purification catalytic device 1 of the present embodiment includes a first catalyst 50 disposed at a collecting portion of an exhaust manifold 3 on a downstream side thereof in a flowing direction of an exhaust gas, and a second catalyst 60 is disposed in an exhaust pipe 4. That is to say, the first catalyst 50 is disposed upstream in the flowing direction of the exhaust gas, and the second catalyst 60 is disposed downstream of the first catalyst 50 to be spaced from the first catalyst 50.

Like the catalyst 10 of the first embodiment shown in FIG. 2, each of the first and second catalysts 50 and 60 includes a catalytic layer disposed on a wall of an exhaust gas passage of a cordierite honeycomb substrate 20.

In the present embodiment, a heat insulating layer 70 is provided on an inner wall of the exhaust manifold 3. With the provision of the heat insulating layer 70 upstream of the first catalyst 50 in the flowing direction of the exhaust gas, the exhaust gas from the engine can flow to reach the first catalyst 50 while maintaining its temperature, thereby enhancing the catalytic activity of the first catalyst 50. Although not shown in FIG. 8, the heat insulating layer 70 as the heat insulator may be provided on an inner wall of the exhaust gas passage between the first and second catalysts 50 and 60. This configuration allows maintaining the temperature of even the exhaust gas flowing from the first catalyst 50 to the second catalyst 60, thus increasing the activity of the second catalyst 60 beneficially. The heat insulating layer 70 may be made of any suitable material as long as the material has lower thermal conductivity than a material for the wall of the exhaust gas passage. For example, inorganic oxides such as zirconia may be used, or silicone resin, silicate glass, or any other compound made mostly of Si may also be used. The heat insulator does not have to be the heat insulating layer 70. For example, the exhaust manifold 3 may be provided with a double tube structure. Also in the present embodiment, the engine is not limited to a spark ignition (SI) engine in which the fuel is ignited by a general ignition plug as an assistant igniter. Alternatively, the engine may also be an engine in which a combustion mode is switched with a low-load range of the engine regarded as an operation range for homogeneous charge compression ignition (HCCI) combustion, and with a high-load range of the engine regarded as an operation range for spark ignition (SI) in which the fuel is ignited by the ignition plug as an assistant igniter. Still alternatively, the engine may even be an engine which performs the HCCI combustion in the whole range from the low- through high-load range.

<Configuration of Catalytic Layer>

Figure 9:
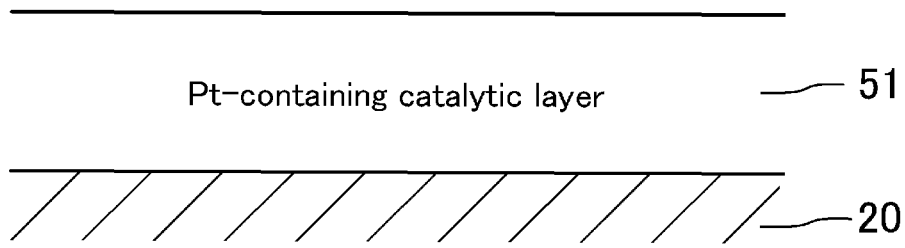
FIG. 9 is a cross-sectional view showing a catalytic layer structure for a first catalyst of the exhaust gas purification catalytic device.

Next, the catalytic layer structures of the first and second catalysts 50 and 60 of the present embodiment will be described below. FIG. 9 is a cross-sectional view showing the catalytic layer structure of the first catalyst 50, and FIG. 10 is a cross-sectional view showing the catalytic layer structure of the second catalyst 60.

As shown in FIG. 9, the first catalyst 50 includes only a Pt-containing catalytic layer 51 on the wall of the exhaust gas passage of the honeycomb substrate 20 (a base). The Pt-containing catalytic layer 51 is the catalytic layer with which the exhaust gas discharged from the engine contacts first, and contains Pt-loaded silica-alumina obtained by loading Pt on silica-alumina. The Pt-containing catalytic layer 51 contains a binder, which may be made of zirconyl nitrate, for example. The first catalyst 50 may contain Pd as a catalytic metal in addition to Pt. In that case, the Pt-containing catalytic layer 51 may contain Pd, or a Pd-containing catalytic layer 61 to be described below may be provided between the Pt-containing catalytic layer 51 and the wall of the exhaust gas passage of the honeycomb substrate 20 to provide a double-layered structure.

Figure 10:
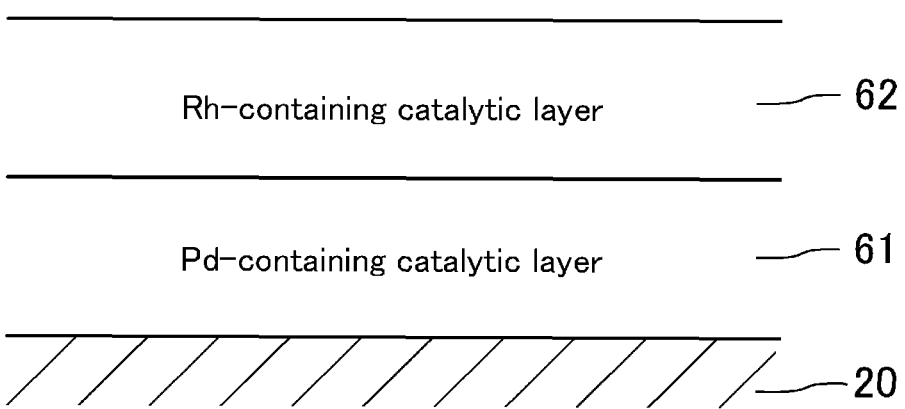
FIG. 10 is a cross-sectional view showing a catalytic layer structure for a second catalyst of the exhaust gas purification catalytic device.

On the other hand, the second catalyst 60 includes, as shown in FIG. 10, a Pd-containing catalytic layer (a lower catalytic layer) 61 on the wall of the exhaust gas passage of the honeycomb substrate (a base) 20, and a Rh-containing catalytic layer (an upper catalytic layer) 62 on the Pd-containing catalytic layer 61, i.e., on a surface of the Pd-containing catalytic layer 61 facing the exhaust gas passage.

The Pd-containing catalytic layer 61 contains Pd as a catalytic metal loaded on a support. For example, the Pd-containing catalytic layer 61 contains Pd-loaded alumina obtained by loading Pd on activated alumina (γ-alumina), and a Pd-loaded ZrCe-based composite oxide obtained by loading Pd on a ZrCe-based composite oxide containing Zr and Ce. The Pd-containing catalytic layer 61 may contain an OSC material having oxygen storage/release capability (OSC) such as ceria. The Pd-containing catalytic layer 61 contains a binder, which may be made of zirconyl nitrate, for example.

On the other hand, the Rh-containing catalytic layer 62 contains Rh as a catalytic metal loaded on a support. The Rh-containing catalytic layer 62 contains, for example, Rh-loaded alumina obtained by loading Rh on activated alumina (γ-alumina), and an Rh-loaded ZrCe-based composite oxide obtained by loading Rh on a ZrCe-based composite oxide containing Zr and Ce. The Rh-containing catalytic layer 62 also contains a binder, which may be made of zirconyl nitrate, for example.

The catalytic materials contained in the first and second catalysts 50 and 60 are prepared in the same manner as in the first embodiment, and description thereof will be omitted herein.

Next, a method for purifying the exhaust gas using the exhaust gas purification catalytic device 1 will be described below. In this method, the first catalyst 50 disposed upstream in the flowing direction of the exhaust gas oxidizes and purifies saturated hydrocarbons having a carbon number of 5 or more in the exhaust gas, thereby increasing, with the heat of reaction by the oxidation and purification, the temperature of the exhaust gas entering the second catalyst 60 disposed downstream of the first catalyst 50. This increases the activity of the second catalyst 60, and allows the second catalyst 60 with the increased activity to oxidize and purify hydrocarbons other than the saturated hydrocarbons having the carbon number of 5 or more in the exhaust gas.

According to such an exhaust gas purification method, a lot of heat of reaction is generated by oxidation and purification of the saturated hydrocarbons (among other things, saturated hydrocarbons having a large carbon number such as $C_5H_{12}$). Thus, the heat of reaction generated by the first catalyst which is disposed upstream in the flowing direction of the exhaust gas and which contains the Pt-loaded silica-alumina increases the temperature of the downstream second catalyst such that the second catalyst can exert its catalytic performance fully. As a result, the exhaust gas can be purified with high efficiency.

EXAMPLES

Some examples and comparative examples will be given below in order to describe the exhaust gas purification catalytic device of the present invention in detail. As for the examples, each including the uppermost catalytic layer containing the Pt-loaded silica-alumina that has already been described for the first embodiment, light-off temperatures (T50) indicative of purification of isopentane ($C_5H_{12}$) were measured, and the results of measurements were compared with those of comparative examples in each of which the uppermost catalytic layer did not contain the Pt-loaded silica-alumina.

In Examples 1-4, the same honeycomb substrates as the ones used in the measurement of the $C_5H_{12}$ purification rate shown in FIG. 7 were adopted. A stacked catalyst with a double-layer structure was provided on the substrate in each of Examples 1 and 2, while a stacked catalyst with a triple-layer structure was provided on the substrate in each of Examples 3 and 4. The following Table 3 shows catalytic layer components that were contained in each of Examples 1-4. In Table 3, the amount of each component is represented in a unit per L of the substrate (g/L).

TABLE 3

| | Component | Material | Content (g/L) |
|---|---|---|---|
| Pd-containing layer | Binder | Zirconyl nitrate | 7.7 |
| | OSC material | ZrCeNd composite oxide | 10 |
| | Pd-loaded alumina | Palladium nitrate | 4.4 |
| | | La (4%)-containing alumina | 44 |
| | Pd-loaded ceria | Palladium nitrate | 0.3 |
| | | ZrCeNd composite oxide | 35 |
| Rh-containing layer | Binder | Zirconyl nitrate | 12.8 |
| | Rh-loaded ceria | Rhodium nitrate | 0.2 |
| | | ZrCeNd composite oxide | 85 |
| | Rh-loaded alumina | Rhodium nitrate | 0.1 |
| | | Zr/La-containing alumina | 27 |
| | Alumina | La (4%)-containing alumina | 13 |

In Table 3, the ZrCeNd composite oxide as the OSC material in the Pd-containing layer has the composition $ZrO_2:CeO_2:Nd_2O_3=55:35:10$ (mass ratio), the ZrCeNd composite oxide in the Pd-loaded ceria has the composition $ZrO_2:CeO_2:Nd_2O_3=67:23:10$ (mass ratio), and the ZrCeNd composite oxide in the Rh-loaded ceria in the Rh-containing layer has the composition $ZrO_2:CeO_2:Nd_2O_3=80:10:10$ (mass ratio).

In Example 1, 30 g/L of Pt-loaded silica-alumina was added to the Rh-containing layer in Table 3.

In Example 2, 18 g/L of Pt-loaded silica-alumina was added to the Rh-containing layer in Table 3, and 12 g/L of Pt-loaded silica-alumina was added to the Pd-containing layer in Table 3.

In Example 3, a Pt-containing layer was further stacked on the Rh-containing layer in Table 3 to provide a triple-layer structure. The Pt-containing layer contained 30 g/L of Pt-loaded silica-alumina and was coated with a predetermined amount of zirconyl nitrate as the binder.

In Example 4, a Pt-containing layer was further stacked on the Rh-containing layer in Table 3 to provide a triple-layer structure. The Pt-containing layer contained 18 g/L of Pt-loaded silica-alumina and was coated with a predetermined amount of zirconyl nitrate, and 6 g/L of Pt-loaded silica-alumina was added to each of the Pd-containing layer and the Rh-containing layer.

As Comparative Example 1, a catalyst containing only the catalytic components shown in Table 3 was prepared.

In Comparative Example 2, 30 g/L of Pt-loaded silica-alumina contained in Example 1 was replaced with 30 g/L in total of Pt-loaded silica and Pt-loaded alumina at a (weight) ratio of 20:80.

In Comparative Example 3, in place of Pt-loaded silica-alumina contained in Example 2, 18 g/L in total of Pt-loaded silica and Pt-loaded alumina was added at a (weight) ratio of 20:80 to the Rh-containing layer, and 12 g/L in total of Pt-loaded silica and Pt-loaded alumina was added at the same ratio to the Pd-containing layer.

In Comparative Example 4, 30 g/L of Pt-loaded silica-alumina contained in Example 3 was replaced with 30 g/L in total of Pt-loaded silica and Pt-loaded alumina at a (weight) ratio of 20:80.

In Comparative Example 5, in place of Pt-loaded silica-alumina contained in Example 4, 18 g/L in total of Pt-loaded silica and Pt-loaded alumina was added at a (weight) ratio of 20:80 to the Pt-containing layer, and 6 g/L in total of Pt-loaded silica and Pt-loaded alumina was added at the same ratio to the Rh-containing layer, and 6 g/L in total of Pt-loaded silica and Pt-loaded alumina was added at the same ratio to the Pd-containing layer.

With respect to each of the catalysts of Examples 1-4 and Comparative Examples 1-3, the light-off temperature (T50) was measured as the $C_5H_{12}$ purification capability after 50-hour aging at 930° C. The light-off temperature (T50) is the temperature of the gas entering the catalyst at which the $C_5H_{12}$ purification rate reaches 50% while the temperature of the model gas introduced into the catalyst is gradually increased from a normal temperature. The model gas was composed of 3000 ppmC of isopentane ($C_5H_{12}$), 1700 ppm of CO, 10.5% of $O_2$, 13.9% of $CO_2$, 10% of $H_2O$, and $N_2$ as the balance. The flow rate of the gas was set to be 26.1 L/min (corresponding to a space velocity SV=63000 $h^{-1}$). The following Table 4 shows the results of measurements of T50 of the catalysts with respect to $C_5H_{12}$.

TABLE 4

|  | i-$C_5H_{12}$ (T50/° C.) |
|---|---|
| Example 1 | 289° C. |
| Example 2 | 302° C. |
| Example 3 | 291° C. |
| Example 4 | 300° C. |
| Comparative Example 1 | 382° C. |
| Comparative Example 2 | 379° C. |
| Comparative Example 3 | 383° C. |
| Comparative Example 4 | 375° C. |
| Comparative Example 5 | 380° C. |

As shown in Table 4, comparison between Examples 1-4 and Comparative Examples 1-5 indicates that Examples 1-4 resulted in the lower light-off temperature (T50), i.e., the higher $C_5H_{12}$ purification capability. As a result of comparison between Example 1 (double-layer structure) and Example 3 (triple-layer structure), and comparison between Example 2 (double-layer structure) and Example 4 (triple-layer structure), there is no significant difference in T50 between them. This suggests that the double-layer catalyst and the triple-layer catalyst exhibited substantially the same level of $C_5H_{12}$ purification capabilities.

These results suggest that the saturated hydrocarbons can be purified with high efficiency by using the Pt-loaded silica-alumina as the catalytic component and that the purification capability can be further improved by adding a larger amount of Pt-loaded silica-alumina to the uppermost catalytic layer of the stacked catalyst.

Next, the HC purification capability was measured on Example 5 including the first catalyst which was disposed upstream in the flowing direction of the exhaust gas as described for the second embodiment and which contained the Pt-loaded silica-alumina, and the second catalyst which was disposed downstream of the first catalyst and which included the Pd-containing catalytic layer and the Rh-containing catalytic layer. Further, for comparison with Example 5, the HC purification capability was measured on Comparative Example 6 in which the first catalyst contained, in place of the Pt-loaded silica-alumina, a catalytic material mixture of Pt-loaded silica and Pt-loaded alumina.

In Example 5, the first catalyst was produced by forming the Pt-containing catalytic layer containing the Pt-loaded silica-alumina on the same honeycomb substrate as those used in Examples 1-4. The second catalyst was produced as a stacked catalyst with a double-layer structure including the Pd-containing catalytic layer and the Rh-containing catalytic layer that were sequentially stacked on the same honeycomb substrate as those used in Examples 1-4.

The Pt-containing catalytic layer of the first catalyst was produced in accordance with the method for preparing the Pt-containing catalytic layer described above. The weight ratio of $SiO_2$ to $Al_2O_3$ in the silica-alumina was set to be $SiO_2:Al_2O_3$=20:80. Pt was loaded on the silica-alumina powder by adding a 5 wt % dinitro diamine platinum nitrate solution to the silica-alumina powder, and evaporating the mixture to dryness. To the Pt-loaded silica-alumina thus prepared, ion exchanged water and a binder were added to obtain slurry, which was then applied on the honeycomb substrate, dried at 150° C., and baked at 500° C. for 2 hours to provide the Pt-containing catalytic layer on the substrate. The Pt-containing catalytic layer was provided on the substrate such that 100 g/L (amount per L of the substrate) of Pt-loaded silica-alumina was contained in the substrate.

On the other hand, the Pd-containing catalytic layer and the Rh-containing catalytic layer of the second catalyst were produced in accordance with the method for preparing the Pd-containing catalytic layer and the Rh-containing catalytic layer described above. The following Table 5 shows the components of these catalytic layers. In Table 5, each component is shown in a unit per L of the substrate (g/L).

TABLE 5

| | Component | Material | Content (g/L) |
|---|---|---|---|
| Pd-containing layer | Binder | Zirconyl nitrate | 8.75 |
| | OSC material | ZrCeNd composite oxide | 10 |
| | Pd-loaded alumina | Palladium nitrate | 4.265 |
| | | La (4%)-containing alumina | 41.475 |
| | Pd-loaded ceria | Palladium nitrate | 0.28 |
| | | ZrCeNd composite oxide | 35 |
| Rh-containing layer | Binder | Zirconyl nitrate | 14.72 |
| | Rh-loaded ceria | Rhodium nitrate | 0.3286 |
| | | ZrCeNd composite oxide | 89.9014 |
| | Rh-loaded alumina | Rhodium nitrate | 0.1264 |
| | | Zr/La-containing alumina | 29.5636 |
| | Alumina | La (4%)-containing alumina | 12.79 |

In Table 5, the ZrCeNd composite oxide used as the OSC material in the Pd-containing catalytic layer and in the Pd-loaded ceria has the composition $ZrO_2:CeO_2:Nd_2O_3$=67:23:10 (mass ratio), and the ZrCeNd composite oxide used in the Rh-loaded ceria in the Rh-containing catalytic layer has the composition $ZrO_2:CeO_2:Nd_2O_3$=80:10:10 (mass ratio). In this example, loading of Pd and Rh by evaporation to dryness was performed by drying and baking at 450° C. Slurry prepared by mixing the catalytic material and ion exchanged water and applied on the substrate was dried and baked at 450° C. for 2 hours after the temperature had been increased at a constant rate from a normal temperature to 450° C. in 1.5 hours. In this example, the substrate provided with the Pd-containing catalytic layer and the Rh-containing catalytic layer was impregnated with a barium acetate aqueous solution. After the impregnation, the temperature of the substrate was increased at a substantially constant rate from a normal temperature to 200° C. in 1.5 hours, and was maintained at 200° C. for 2 hours (dried). After that, the temperature was further increased from 200° C. to 500° C. at a substantially constant rate in 4 hours, and was maintained at 500° C. for 2 hours (baked).

Comparative Example 6 uses the same second catalyst as Example 5, but only the composition of the first catalyst used in Comparative Example 6 is different from that of Example 5. Specifically, in Comparative Example 6, the Pt-containing catalytic layer of the first catalyst contains, in place of the Pt-loaded silica-alumina, Pt-loaded silica and Pt-loaded alumina at a (mass) ratio of 20:80. The Pt-loaded silica was obtained by adding a dinitro diamine platinum nitrate solution to silica powder, and evaporating the mixture to dryness. The Pt-loaded alumina was obtained by adding 5 wt % of dinitro diamine platinum nitrate solution to alumina powder, and evaporating the mixture to dryness. The Pt-loaded silica and Pt-loaded alumina thus prepared were mixed at a mass ratio of 20:80, and ion exchanged water and a binder were added to the mixture to obtain slurry. The slurry thus obtained was applied on the honeycomb substrate, dried at 150° C., and baked at 500° C. for 2 hours to provide the Pt-containing catalytic layer on the substrate. The Pt-containing catalytic layer was provided on the substrate such that 100 g/L (an amount per L of the substrate) of Pt-loaded silica and Pt-loaded alumina was contained in the substrate.

Each of the first and second catalysts of Example 5 and Comparative Example 6 was loaded into a model gas flow reactor, and a model gas containing HC components was introduced to measure the HC purification capability. Those catalysts were arranged in the model gas flow reactor such that the first and second catalysts were spaced apart from each other and that the first catalyst was positioned upstream of the second catalyst in the flowing direction of the gas. These catalysts were aged in advance in an atmosphere including 2% of $O_2$ and 10% of $H_2O$ at 800° C. for 24 hours. Thereafter, the temperatures of the catalysts were maintained at 100° C. in a $N_2$ atmosphere. Five minutes later than the introduction of the model gas into the catalysts, the temperature of the model gas was increased from 100° C. at a rate of 30° C./minute, and HC concentration at the outlet of the second catalyst was measured to calculate the HC purification rate when the temperature of the gas introduced into the catalyst was 250° C. and 300° C. The model gas was composed of 1000 ppmC of n-pentane, 1000 ppmC of i-pentane, 2000 ppmC of toluene, 1500 ppm of CO, 30 ppm of NO, 10% of $O_2$, 10% of $H_2O$, and $N_2$ as the balance. The flow rate of the gas was set to be 26.1 L/min (corresponding to a space velocity $SV=63000\ h^{-1}$).

Figure 11:
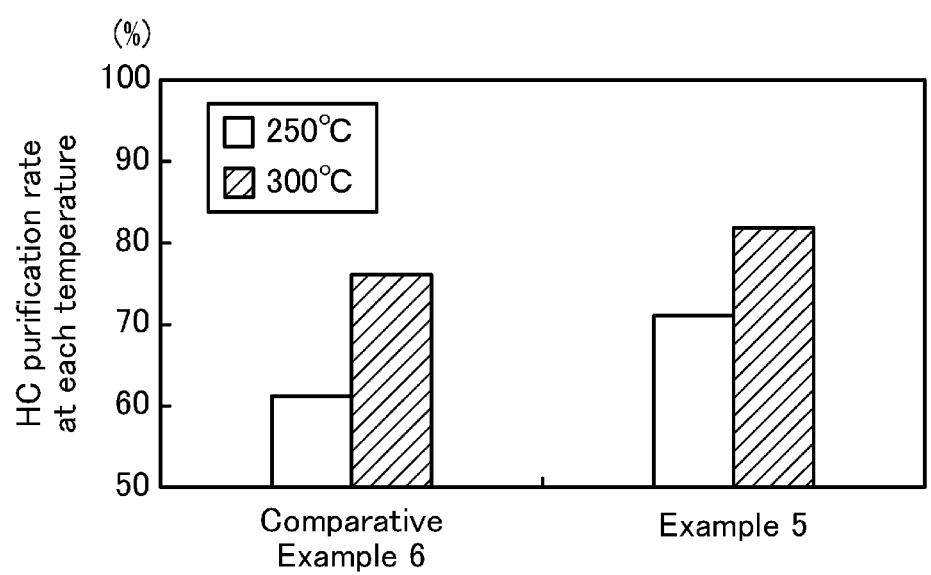
FIG. 11 is a graph showing HC purification rates of Example 5 and Comparative Example 6.

FIG. 11 shows the results of the measurement of the HC purification rates at 250° C. and 300° C. of Example 5 and Comparative Example 6.

As shown in FIG. 11, comparison between Example 5 and Comparative Example 6 indicates that Example 5 achieved the higher HC purification rate. This is presumably because the first catalyst of Example 5 contained the Pt-loaded silica-alumina, and had higher capability to oxidize and purify n-pentane, i-pentane, and other substances than the catalyst of Comparative Example 6. In addition, this should also be because the heat of reaction generated by the oxidation of n-pentane, i-pentane, and other substances propagated to the downstream second catalyst to increase the activity of the second catalyst. These results suggested that the provision of the first catalyst containing the Pt-loaded silica-alumina upstream of the second catalyst increases the capability to purify the exhaust gas such as HC.

Third Embodiment

An exhaust gas purification catalytic device according to a third embodiment of the present invention will be described below. In the following description of this third embodiment, any members that are identical to the counterparts of the embodiments described above will be identified by the same reference characters as their counterparts', and will not be described in detail all over again. Instead, the following description will be focused on only the difference between this and those embodiments.

Figure 12:
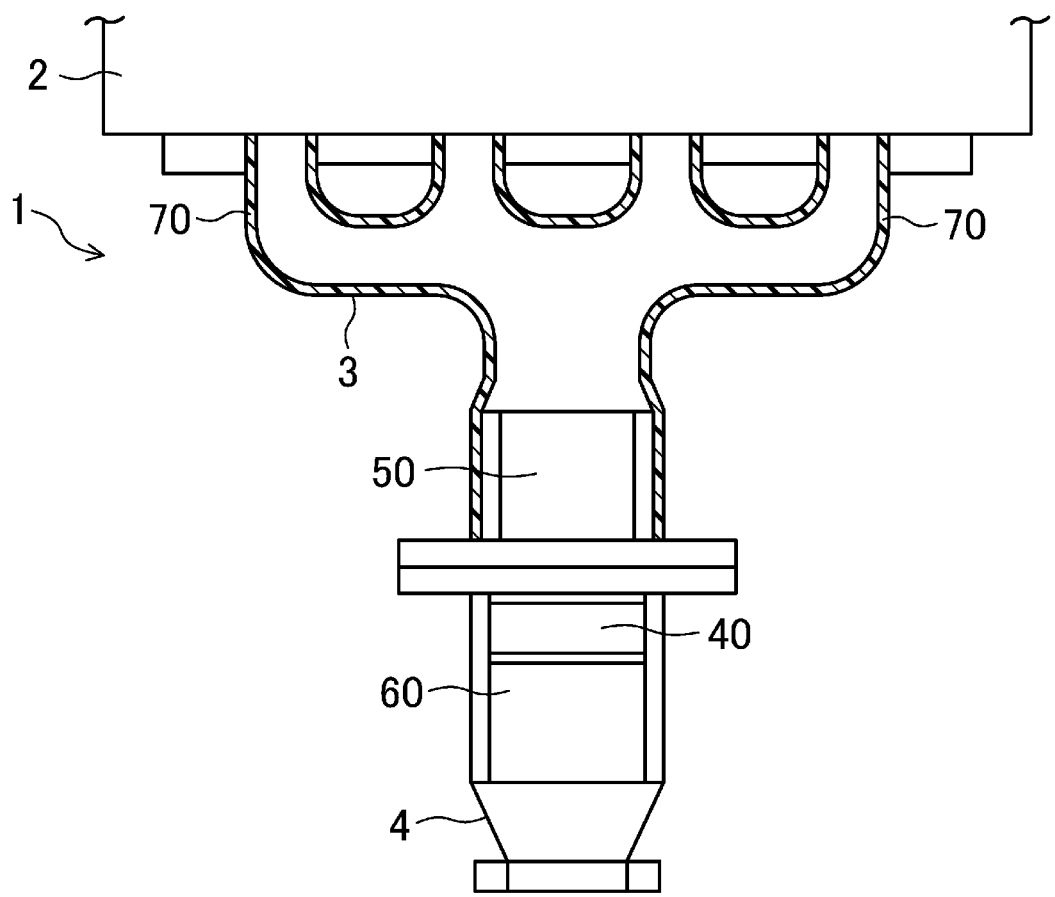
FIG. 12 is a schematic view showing an exhaust gas purification catalytic device according to a third embodiment of the present invention.

As shown in FIG. 12, an exhaust gas purification catalytic device 1 of the present embodiment includes an HC trapping portion 40 provided on an upstream side of an exhaust pipe 4 in a flowing direction of an exhaust gas, and a second catalyst 60 provided downstream of the HC trapping portion 40 in the flowing direction of the exhaust gas. That is to say, in an exhaust gas passage, the first catalyst 50, the HC trapping portion 40, and the second catalyst 60 are arranged in this order from the upstream side to the downstream side in the flowing direction of the exhaust gas. In the present embodiment, a heat insulating layer 70 as a heat insulator is also provided on an inner wall of the exhaust manifold 3 as in the second embodiment. The heat insulator does not have to be the heat insulating layer 70. For example, the exhaust manifold 3 may be provided with a double tube structure.

The configurations of the first and second catalysts 50 and 60 are the same as those described for the second embodiment. Specifically, the first catalyst 50 includes a Pt-containing catalytic layer 51 with which the exhaust gas discharged from the engine contacts first (see FIG. 9) and which contains Pt-loaded silica-alumina. The second catalyst 60 includes a Pd-containing catalytic layer 61 and an Rh-containing catalytic layer 62 (FIG. 10).

Figure 13:
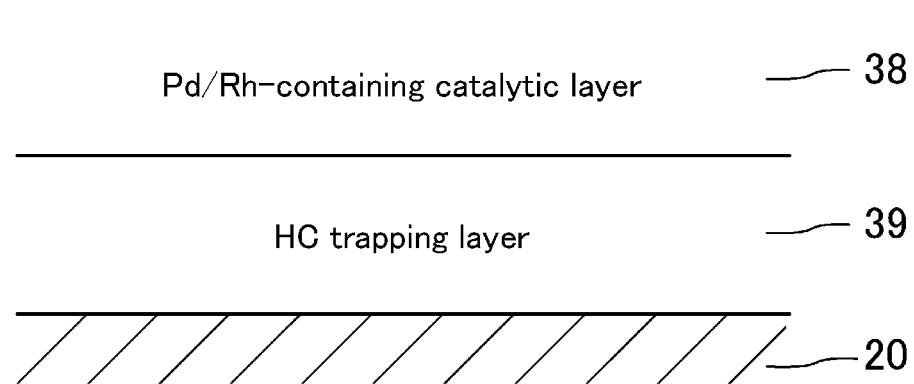
FIG. 13 is a cross-sectional view showing an alternative catalytic layer structure for a second catalyst of the exhaust gas purification catalytic device.

The HC trapping portion 40 has the same configuration as the first catalyst 50 except that an HC trapping layer containing an HC trapping material is provided on a wall of the exhaust gas passage of the honeycomb substrate 20 in place of the catalytic layer. The second catalyst 60 described for the second embodiment is the double-layer catalyst including the Pd-containing catalytic layer 31 and the Rh-containing catalytic layer 32. However, the second catalyst 60 may also be a catalytic layer with a single-layer structure which contains Pd and Rh and which is provided on the wall of the exhaust gas passage of the honeycomb substrate 20. Alternatively, as shown in FIG. 13, an HC trapping layer 39 containing an HC trapping material may be provided between the single-layer Pd/Rh-containing catalytic layer 38 containing Pd and Rh and the wall of the exhaust gas passage of the honeycomb substrate 20. Still alternatively, the HC trapping layer 39 may be provided between a catalytic layer with a double-layer structure including the Pd-containing catalytic layer 31 and the Rh-containing catalytic layer 32 and the wall of the exhaust gas passage of the honeycomb substrate 20.

As can be seen, with the provision of the HC trapping layer, HC can be trapped not only by the HC trapping portion 40, but also by the HC trapping layer 39 of the second catalyst 30 when the temperature of the exhaust gas is low. The HC thus trapped can be desorbed after the temperature of the exhaust gas has risen, and can efficiently be oxidized and purified by the second catalyst 30 activated.

<Method for Forming HC Trapping Portion>

A HC trapping material used for the HC trapping portion 40 may be an HC trapping material generally used, and may be β zeolite, for example. β zeolite and a predetermined solvent are mixed, and the mixture is applied on the wall of the exhaust gas passage of the honeycomb substrate, dried at about 150° C., and then baked at about 500° C. for 2 hours. In this manner, the HC trapping portion can be obtained.

<Method for Purifying Exhaust Gas>

Next, a method for purifying the exhaust gas using the exhaust gas purification catalytic device 1 will be described. In this method, the HC trapping portion 40 preferentially traps hydrocarbons other than the saturated hydrocarbons having a carbon number of 5 or more in the exhaust gas discharged from the engine that has just been started. The first catalyst 50 oxidizes and purifies particularly the saturated hydrocarbons having the carbon number of 5 or more in the exhaust gas that has been discharged since the engine was started, and the heat of reaction generated by the oxidation and purification increases the temperature of the exhaust gas entering the HC trapping portion 40 and the second catalyst 60. Then, the increase in the temperature of the exhaust gas entering the HC trapping portion 40 desorbs the trapped hydrocarbons other than the saturated hydrocarbons having the carbon number of 5 or more, and the increase in the temperature of the exhaust gas entering the second catalyst 60 enhances the activity of the second catalyst 60. In this manner, the second catalyst 60 thus activated oxidizes and purifies the hydrocarbons desorbed from the HC trapping portion 40 other than the saturated hydrocarbons having the carbon number of 5 or more.

According to the exhaust gas purification method, a lot of heat of reaction is generated by the oxidation and purification of the saturated hydrocarbons (among other things, the saturated hydrocarbons having the large carbon number such as $C_5H_{12}$). The heat of reaction generated by the first catalyst 50 which is disposed upstream in the flowing direction of the exhaust gas and which contains Pt-loaded silica-alumina can increase the temperature of the downstream second catalyst 60, thus allowing the second catalyst 60 to exert its catalytic performance fully. This allows purification of the exhaust gas with high efficiency. Since the HC trapping portion 40 can trap HC in the exhaust gas until the activity of the second catalyst 60 is enhanced, the amount of HC discharged out of the chamber right after the engine has been started and before the catalyst is activated sufficiently yet can be reduced.

Example 6 and Comparative Example 7 of the present embodiment will now be described. An exhaust gas purification catalytic device of Example 6, including a first catalyst containing Pt-loaded silica-alumina, an HC trapping portion containing an HC trapping material, and a second catalyst containing Pd and Rh which were arranged in this order from an upstream point to a downstream point in the flowing direction of the exhaust gas, had its HC purification rate measured. Meanwhile, a catalytic device of which the first catalyst contained a mixture of Pt-loaded silica and Pt-loaded alumina in place of the Pt-loaded silica-alumina, was prepared as Comparative Example 7 and had its HC purification rate measured. The honeycomb substrates used in the measurement of the $C_5H_{12}$ purification rate shown in FIG. 7 were used in Example 6 and Comparative Example 7.

The first catalyst of Example 6 was configured in the same manner as the first catalyst of Example 5 (the second embodiment). The second catalyst of Example 6 was obtained by forming the Pd-containing layer and the Rh-containing layer shown in Table 3 on the cell wall of the honeycomb substrate. In Table 3, the ZrCeNd composite oxide used as the OSC material in the Pd-containing layer and in the Pd-loaded ceria had the composition $ZrO_2:CeO_2:Nd_2O_3$=67:23:10 (mass ratio), and the ZrCeNd composite oxide in Rh-loaded ceria in the Rh-containing catalytic layer had the composition $ZrO_2:CeO_2:Nd_2O_3$=80:10:10 (mass ratio).

In the same manner as the preparation of the second catalyst of Example 5 (the second embodiment), the second catalyst was also prepared by loading Pd and Rh by evaporation to dryness, drying and baking the slurry applied on the substrate, impregnating the product with a barium acetate aqueous solution, and then thermally treating the impregnated.

The HC trapping portion was obtained by coating the honeycomb substrate with β zeolite such that the amount of β zeolite would be 100 g/L relative to the substrate, drying the coating at 150° C., and then baking the coating at 500° C. for 2 hours.

Comparative Example 7 included the same second catalyst and the same HC trapping portion as those of Example 6, but only the configuration of the first catalyst was different from that of Example 6. The first catalyst of this Comparative Example 7 had the same configuration as the first catalyst of Comparative Example 6.

Each of the first catalysts, HC trapping portions, and second catalysts of Example 6 and Comparative Example 7 was loaded into a model gas flow reactor, and a model gas containing an HC component was introduced to measure the HC purification capability. The first catalyst, HC trapping portion, and second catalyst were arranged in the model gas flow reactor such that the HC trapping portion was positioned downstream of the first catalyst in the flowing direction of the exhaust gas, and the second catalyst was positioned downstream of the HC trapping portion in the flowing direction of the exhaust gas. These catalysts had been aged in advance in the same manner as in Example 5 and Comparative Example 6. Then, in the same conditions and method as those of Example 5 and Comparative Example 6, the HC purification rates until the temperature of the model gas reached 250° C. and until the temperature reached 300° C. were measured.

Figure 14:
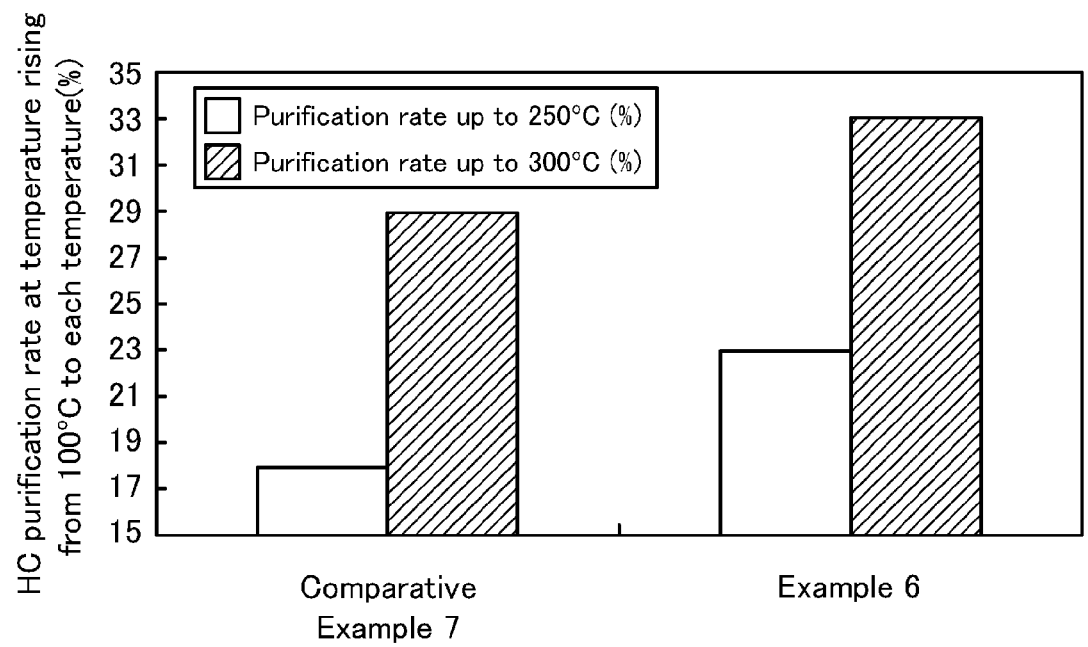
FIG. 14 is a graph showing HC purification rates of Example 6 and Comparative Example 7.

As can be seen from the results of the measurement shown in FIG. 14, comparison between the HC purification rates of Example 6 and Comparative Example 7 shows that both of the HC purification rates measured until the model gas temperature reached 250° C. and 300° C. were higher in Example 6 than in Comparative Example 7. This is presumably because the first catalyst of Example 6 contained Pt-loaded silica-alumina, and had higher capability to oxidize and purify n-pentane, i-pentane, and other substance than the catalyst of Comparative Example 7. In addition, this should also be because the heat of reaction generated by the oxidation of n-pentane, i-pentane, and other substances propagated to the downstream second catalyst to enhance the activity of the second catalyst. These results suggested that the provision of the first catalyst containing the Pt-loaded silica-alumina upstream of the second catalyst would improve the capability to purify an exhaust gas such as HC.

Fourth Embodiment

An exhaust gas purification catalytic device according to a fourth embodiment of the present invention will be described below. In the following description of this fourth embodiment, any members that are identical to the counterparts of the embodiments described above will be identified by the same reference characters as their counterparts', and will not be described in detail all over again. Instead, the following description will be focused on only the difference between this and those embodiments.

Figure 15:
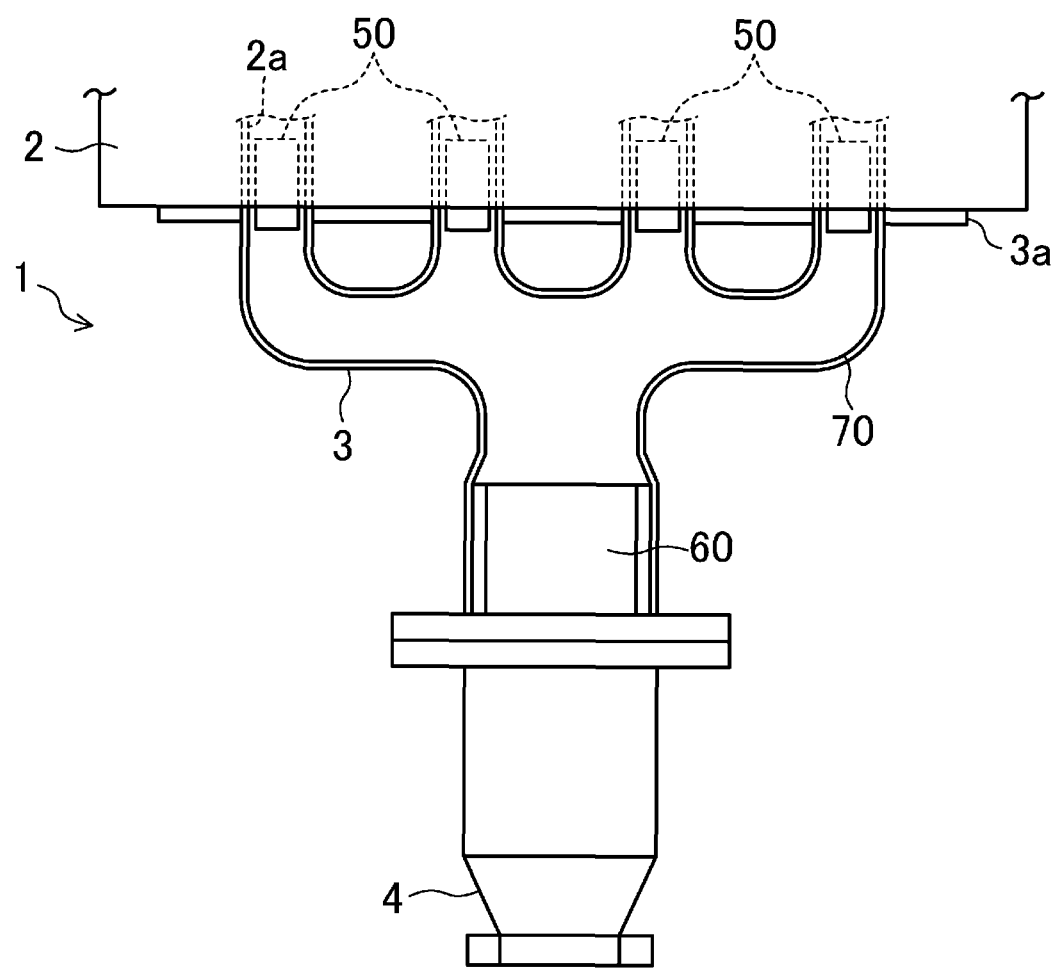
FIG. 15 is a schematic view showing a configuration for an exhaust gas purification catalytic device according to a fourth embodiment of the present invention.

Referring to FIG. 15, the reference numeral 1 denotes an exhaust gas purification catalytic device of the present embodiment, the reference numeral 2 denotes a cylinder head of an engine, the reference numeral 2a denotes exhaust ports of the engine, and the reference numeral 3a denotes a flange of an exhaust manifold 3 connected to the exhaust ports 2a. The flange 3a is coupled to the cylinder head 2. A first catalyst 50 is disposed in each of the exhaust ports 2a of the cylinder head 2, and a second catalyst 60 is disposed in a collecting part of the exhaust manifold 3 at a downstream side thereof in a flowing direction of an exhaust gas. In an exhaust gas passage, the first and second catalysts 50 and 60 are sequentially arranged from an upstream point to a downstream point in the flowing direction of the exhaust gas. A heat insulator 70 is provided on an inner wall of each exhaust port 2a and an inner wall of the exhaust manifold 3.

Figure 16:
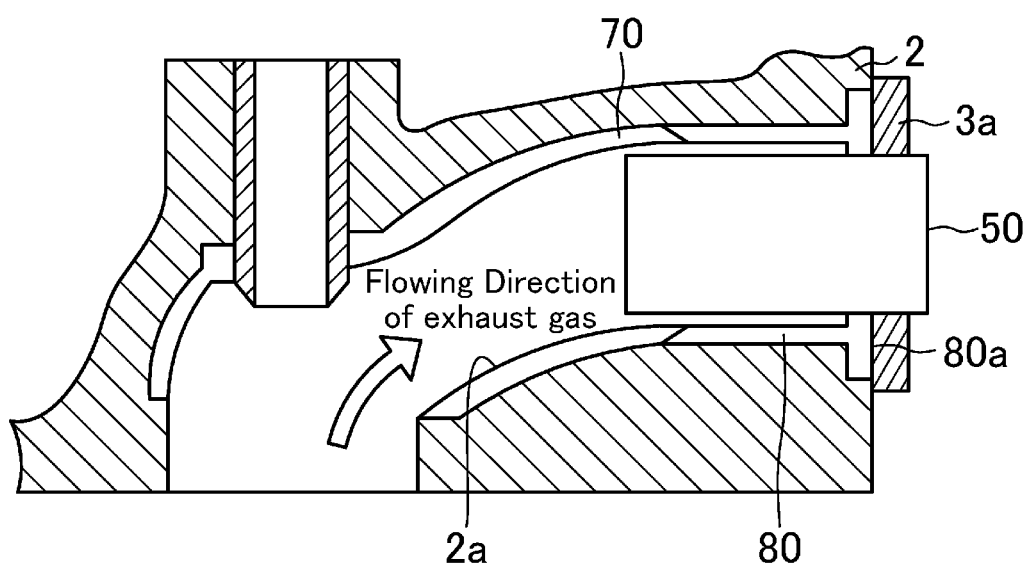
FIG. 16 is a cross-sectional view showing an exhaust port and surrounding portions of the exhaust gas purification catalytic device.

The configuration of the exhaust port 2a in which the first catalyst 50 is disposed will be described with reference to FIG. 16, which is a cross-sectional view showing the exhaust port 2a of the engine. FIG. 16 does not show an exhaust valve for the sake of simplicity of illustration.

The first catalyst 50 is disposed at a downstream end of the exhaust port 2a in the flowing direction of the exhaust gas. The first catalyst 50 is attached to a tubular attachment 80 inserted in the exhaust port 2a from the downstream side in the flowing direction of the exhaust gas. The attachment 80 includes a flange 80a at an end thereof in its longitudinal direction (a downstream end in the flowing direction of the exhaust gas). The flange 80a includes a portion projecting outward in the radial direction of the attachment 80, and a part projecting inward in the radial direction. This flange 80a is connected to the flange 3a which is arranged upstream of the exhaust manifold 3 in the flowing direction of the exhaust gas.

The first catalyst 50 is inserted in the attachment 80, and has its outer peripheral surface joined to an inner peripheral surface of the flange 80a of the attachment 80 by welding. The flange 80a projects not only outward, but also inward, in the radial direction of the attachment 80. Thus, a gap is created between the inner peripheral surface of a body of the attachment 80 except for the flange 80a and the outer peripheral surface of the first catalyst 50. The first catalyst 50 does not have to be joined to the flange 80a at the downstream end in the flowing direction of the exhaust gas. Instead, the downstream end of the first catalyst 50 may be inserted in the exhaust manifold 3.

In the present embodiment, a heat insulating double tube made of a stainless steel is provided as a cast member functioning as the heat insulator 70 on an inner peripheral surface of the exhaust port 2a of the cylinder head 2. A downstream end of the heat insulator 70 made of the heat insulating double tube is in contact with an upstream end of the attachment 80. Thus, the exhaust gas discharged from the engine can be introduced into the first catalyst 50 with its temperature maintained, thus efficiently enhancing the catalyst activity of the first catalyst 50. The attachment 80 and the exhaust manifold 3 are preferably made of the heat insulating double tube. Although the heat insulating double tube is used as the heat insulator 70 in the present embodiment, this is only an example. Alternatively, a heat insulating layer made of a material having a lower thermal conductivity than the material of the wall of the exhaust gas passage may be provided as described above.

Figure 17:
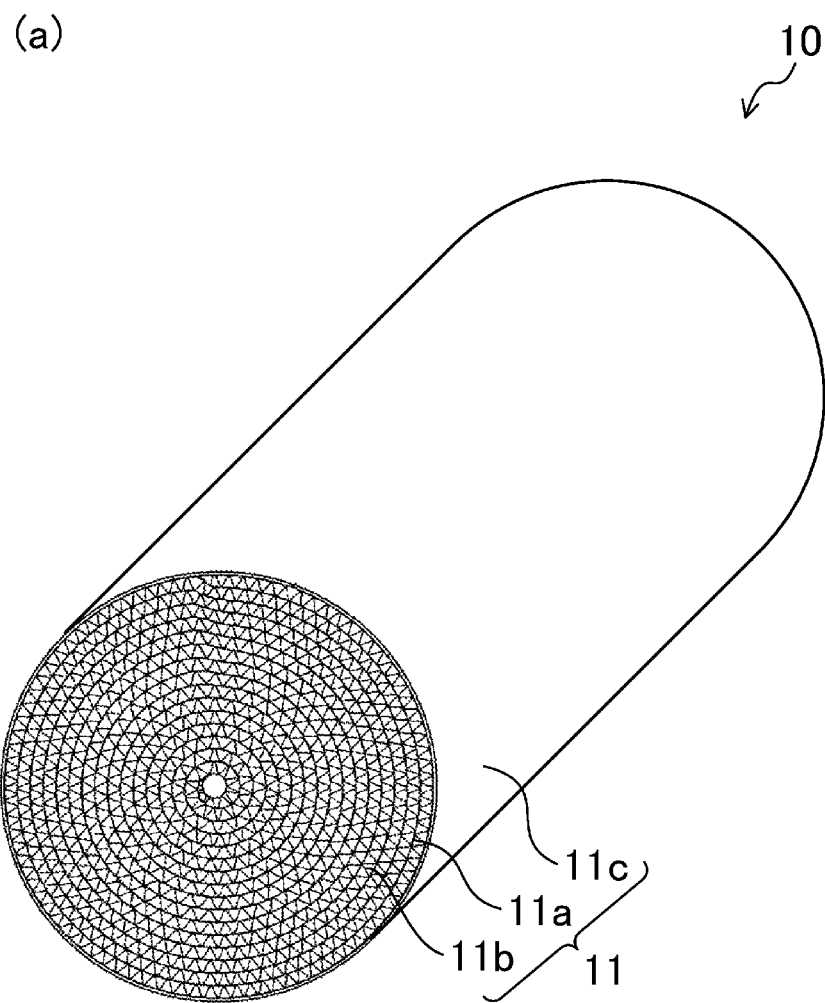
FIG. 17(a) is a perspective view of a first catalyst of the exhaust gas purification catalytic device.
FIG. 17(b) is an enlarged view showing a portion of a transversal cross-section of the first catalyst.
Figure 17:
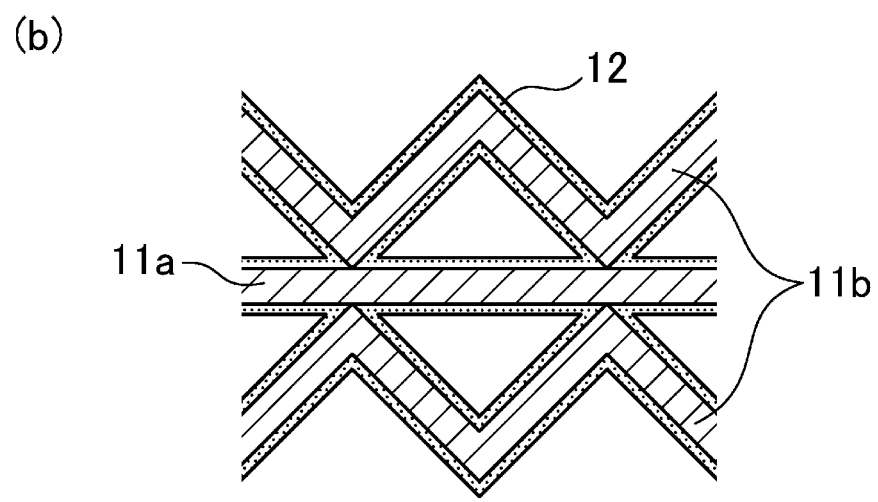

FIG. 17 shows the configuration of the first catalyst 50. FIG. 17(*a*) is a perspective view of the first catalyst 50, and FIG. 17(*b*) is an enlarged view showing a portion of a transverse cross-section of the first catalyst 50. The first catalyst 50 is provided by disposing a catalytic layer 12 on a wall of an exhaust gas passage of a metal substrate 11 made of a metallic material. The metal substrate 11 may be formed by inserting, into a cylindrical member 11 made of stainless steel, a stack of a flat plate 11a and a corrugated plate 11b that are made of stainless steel and that have been wound into a spiral shape. Thus, multiple cell passages (exhaust gas passages) are formed between the flat plate 11a and the corrugated plate 11b. The metal substrate 11 has had its surface oxidized, and the catalytic layer 12 is formed on the oxidized surface. The second catalyst 60 has the same configuration as the first catalyst 50 except for the components and the size of the catalytic layer 12.

<Configuration of Catalytic Layer>

The catalytic layer structures of the first and second catalysts 50 and 60 of the present embodiment will be described below.

Figure 18:
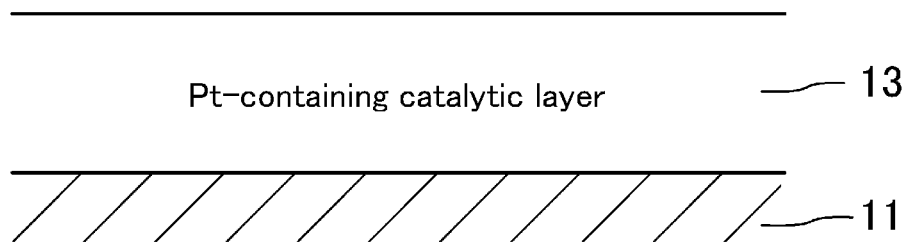
FIG. 18 is a cross-sectional view showing a catalytic layer structure for the first catalyst of the exhaust gas purification catalytic device.

As shown in FIG. 18, the first catalyst 50 includes a Pt-containing catalytic layer 13 as the catalytic layer 12 disposed on the wall of the exhaust gas passage of the metal substrate 11 (a base). This Pt-containing catalytic layer 13 is a catalytic layer with which the exhaust gas discharged from the engine contacts first, and is configured in the same manner as the Pt-containing catalytic layer 51 of the first catalyst 50 of the second embodiment shown in FIG. 9. That is to say, the Pt-containing catalytic layer 13 contains Pt-loaded silica-alumina.

Figure 19:
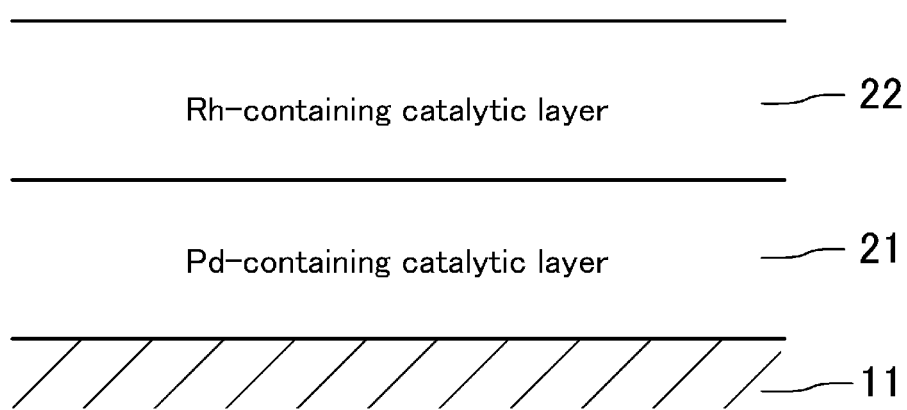
FIG. 19 is a cross-sectional view showing a catalytic layer structure for a second catalyst of the exhaust gas purification catalytic device.

As shown in FIG. 19, the second catalyst 60 includes a Pd-containing catalytic layer (a lower catalytic layer) 21 on the wall of the exhaust gas passage of the metal substrate 11 (a base), and an Rh-containing catalytic layer (an upper catalytic layer) 22 on the Pd-containing catalytic layer 21, i.e., on one surface of the Pd-containing catalytic layer 21 facing the exhaust gas passage. The Pd-containing catalytic layer 21 and the Rh-containing catalytic layer 22 have the same structure as the Pd-containing catalytic layer 61 and the Rh-containing catalytic layer 62 of the second catalyst 60 of the second embodiment shown in FIG. 10.

Here, the second catalyst 60 has a double-layer structure comprised of the Pd-containing catalytic layer 21 and the Rh-containing catalytic layer 22. However, the second catalyst may have a single-layer structure in which one catalytic layer containing Pd and Rh is formed on the wall of the exhaust gas passage of the metal substrate 11.

Examples 7 and 8 and Comparative Examples 8 and 9 of the present embodiment will be described below. Using an engine bench, the HC purification rate was measured on Examples 7 and 8 in which the first catalyst containing Pt-loaded silica-alumina was disposed in the exhaust port, and the second catalyst containing Pd and Rh was disposed at the downstream end of the exhaust manifold. Further, the HC purification rate was measured on catalyst devices of Comparative Examples 8 and 9 in which the first catalyst contained a mixture of Pt-loaded silica and Pt-loaded alumina, in place of Pt-loaded silica-alumina alone.

In Example 7, the first catalyst was obtained by forming a Pt-containing catalytic layer containing Pt-loaded silica-alumina on a metal substrate (with a diameter of 60 mm and a length of 100 mm) The Pt-containing catalytic layer had the same structure as its counterpart of the first catalyst of Example 5. The second catalyst of Example 7 was obtained by forming a Pd-containing catalytic layer and an Rh-containing catalytic layer on the same metal substrate. The Pd-containing catalytic layer and the Rh-containing catalytic layer had the same structure as their counterparts of the second catalyst of Example 6 (Table 3).

Example 8 is different from Example 7 in that a Pd-containing catalytic layer was provided between the wall of the exhaust gas passage of the substrate and the Pt-containing catalytic layer of the first catalyst. Catalyst powder of the Pd-containing catalytic layer was obtained by adding a 2.5 wt % of dinitro diamine palladium nitrate solution to alumina powder, evaporating the mixture thus obtained to dryness to load Pd on the alumina powder, drying the powder thus obtained at 150° C., and then baking the dried powder at 500° C. for 2 hours. The catalyst powder was mixed with a predetermined amount of a binder, applied on the substrate such that the amount of the catalyst powder was 40 g/L, dried at 150° C., and baked at 500° C. for 2 hours to obtain a Pd-containing catalytic layer. Another Pt-containing catalytic layer was formed on the Pd-containing catalytic layer thus obtained to form a catalytic layer with a double-layer structure.

Comparative Example 8 is the same as Example 7 in the configuration of the second catalyst, but is different from Example 7 only in the configuration of the first catalyst. Comparative Example 9 is the same as Example 8 in the configuration of the second catalyst, but is different from Example 8 only in the configuration of the first catalyst. Specifically, in Comparative Examples 8 and 9, the Pt-containing catalytic layer in the first catalyst contained, in place of Pt-loaded silica-alumina, Pt-loaded silica and Pt-loaded alumina at a (mass) ratio of 20:80. The Pt-containing catalytic layer of the first catalyst of Comparative Examples 8 and 9 has the same structure as its counterpart of the first catalyst of Comparative Example 6.

Figure 20:
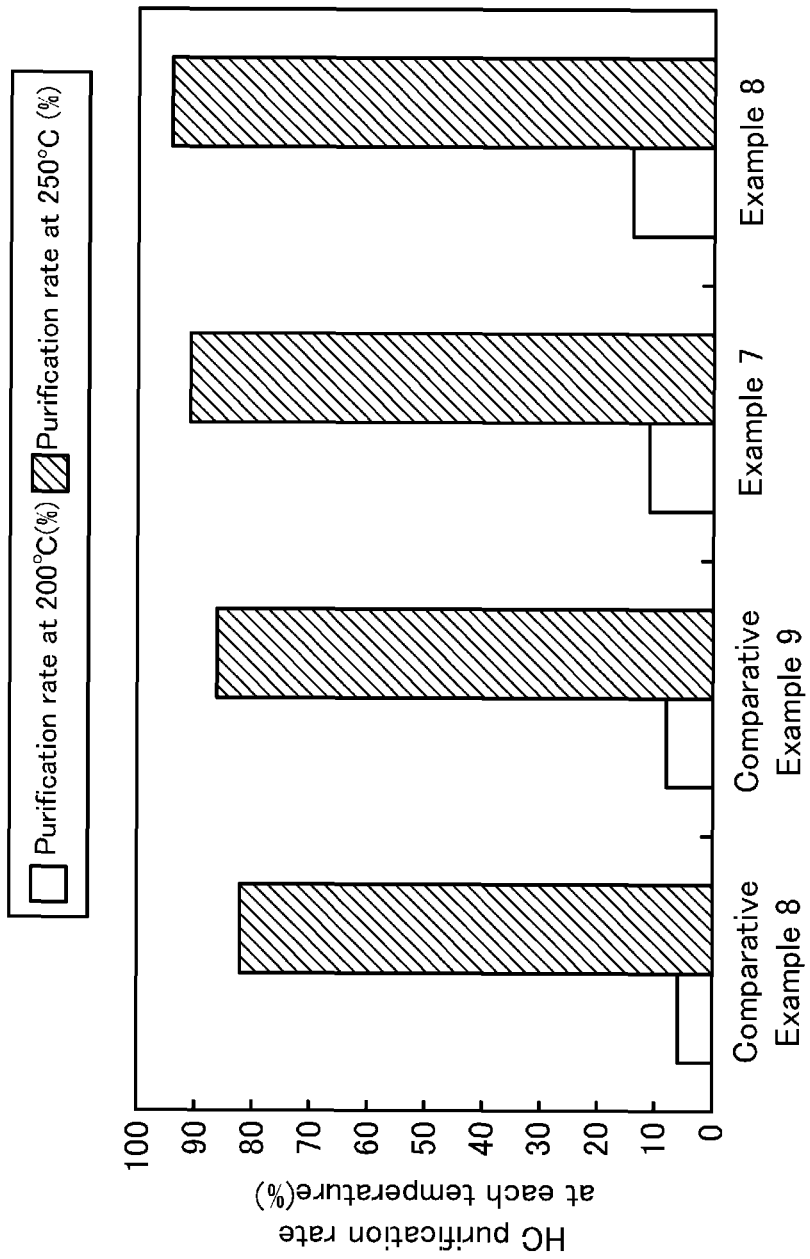
FIG. 20 is a graph showing HC purification rates of Examples 7 and 8 and Comparative Examples 8 and 9.

Each of the first catalysts of Examples 7 and 8, and Comparative Examples 8 and 9 was attached to an exhaust port of the engine bench, and the second catalyst was attached to the collecting part of the exhaust manifold. Then, the engine was started to measure the HC purification rate at gas temperatures of 200° C. and 250° C. These catalysts had been aged in advance in an atmosphere including 2% of $O_2$ and 10% of $H_2O$ at 800° C. for 24 hours. The gas temperature was measured at a position of 5 mm upstream of the first catalyst in the exhaust port. The engine was operated at a net mean effective pressure (Pe) of 100 kPa and an engine speed of 1000 rpm at 200° C., while the engine was operated at Pe of 200 kPa and an engine speed of 1000 rpm at 250° C. The HC concentration in the exhaust gas upstream of the first catalyst, and the HC concentration in the exhaust gas downstream of the second catalyst were measured when the exhaust gas temperature was 200° C. and 250° C., and the HC purification rate was calculated. FIG. 20 shows the results.

As shown in FIG. 20, comparison between the HC purification rates of Examples 7 and 8 and those of Comparative Examples 8 and 9 reveals that Examples 7 and 8 achieved the higher HC purification rate in both situations where the exhaust gas temperature was 200° C. and 250° C. This is presumably because the first catalysts of Examples 7 and 8 contained the Pt-loaded silica-alumina, and had higher capability to oxidize and purify n-pentane, i-pentane, and other substances than the catalysts of Comparative Examples 8 and 9. In addition, this should also be because the heat of reaction generated by the oxidation of n-pentane, i-pentane, and other substances propagated to the downstream second catalyst to enhance the activity of the second catalyst. Thus, these results suggested that the provision of the first catalyst containing the Pt-loaded silica-alumina upstream of the second catalyst improved the capability to purify the exhaust gas such as HC. Further, comparison between Examples 7 and 8 indicates that Example 8 achieved the higher HC purification rate. This is presumably because the first catalyst of Example 8 contained Pd, and exhibited the higher activity at a low temperature.

DESCRIPTION OF REFERENCE CHARACTERS

1 Exhaust gas purification catalytic device
2 Cylinder head
3 Exhaust manifold
4 Exhaust pipe
10 Catalyst
11 Metal support
20 Honeycomb support
30, 35 Catalytic layer
31 Pd-containing catalytic layer (lower layer, lowermost layer)
32 Pt/Rh-containing catalytic layer (upper layer)
36 Rh-containing catalytic layer (intermediate layer)
37 Pt-containing catalytic layer (uppermost layer)
38 Pd/Rh-containing catalytic layer (upper layer)
39 HC trapping layer
40 HC trapping portion
50 First catalyst
51 Pt-containing catalytic layer
60 Second catalyst
61 Pd-containing catalytic layer
62 Rh-containing catalytic layer
70 Heat insulating layer

The invention claimed is:

1. An exhaust gas purification catalytic device which is disposed in an exhaust gas passage of an engine comprising:
a plurality of catalytic layers to purify an exhaust gas discharged from the engine, wherein
Pt is contained as a catalytic metal,
the catalytic metal Pt is loaded on silica-alumina which serves as a support and in which alumina is modified by silicon,
the plurality of catalytic layers form a stack,
Pt-loaded silica-alumina obtained by loading the Pt on the silica-alumina is contained in an uppermost one of the plurality of catalytic layers with which the exhaust gas contacts first,
the Pt-loaded silica-alumina is also contained in at least one catalytic layer of the stack of catalytic layers other than the uppermost catalytic layer, and
the uppermost catalytic layer is higher in content of the Pt-loaded silica-alumina than the at least one catalytic layer other than the uppermost catalytic layer.

2. The exhaust gas purification catalytic device of claim 1, wherein
the uppermost catalytic layer of the stack of catalytic layers further contains Rh, and
a catalytic layer of the stack which is located under the uppermost catalytic layer contains Pd.

3. The exhaust gas purification catalytic device of claim 1, wherein
the plurality of catalytic layers is a stack of three catalytic layers,
a lowermost catalytic layer of the stack of three catalytic layers contains Pd,
an intermediate catalytic layer of the stack of three catalytic layers contains Rh, and
an uppermost catalytic layer of the stack of three catalytic layers contains the Pt-loaded silica-alumina.

4. The exhaust gas purification catalytic device of claim 1, wherein
the engine is capable of performing HCCI combustion.

5. An exhaust gas purification catalytic device which is disposed in an exhaust gas passage of an engine comprising:
- a first catalyst, and a second catalyst disposed downstream of the first catalyst in a flowing direction of an exhaust gas discharged from the engine,
- a plurality of catalytic layers to purify the exhaust gas discharged from the engine, wherein
- Pt is contained as a catalytic metal,
- the catalytic metal Pt is loaded on silica-alumina which serves as a support and in which alumina is modified by silicon, wherein
- the first catalyst includes the plurality of catalytic layers, and one of the plurality of catalytic layers with which the exhaust gas contacts first, contains Pt-loaded silica-alumina obtained by loading the Pt on the silica-alumina,
- the exhaust gas purification catalytic device further comprises an HC trapping portion which is disposed downstream of the first catalyst in the flowing direction of the exhaust gas, and contains an HC trapping material,
- the second catalyst is disposed downstream of the HC trapping portion in the flowing direction of the exhaust gas, and
- the second catalyst includes, as one of the plurality of catalytic layers, a catalytic layer containing Pd and Rh as catalytic metals, while the first catalyst contains neither Pd nor Rh.

6. The exhaust gas purification catalytic device of claim 5, wherein
- the first and second catalysts are spaced apart from each other.

7. The exhaust gas purification catalytic device of claim 5, wherein
- the second catalyst includes an HC trapping layer containing the HC trapping material, and includes, as one of the plurality of catalytic layers, a Pd/Rh-containing layer which contains Pd and Rh as the catalytic metals and which is located on the HC trapping layer.

8. The exhaust gas purification catalytic device of claim 5, wherein
- a heat insulator is provided in at least one of the exhaust gas passage upstream of the first catalyst in the flowing direction of the exhaust gas, and the exhaust gas passage between the first and second catalysts.

9. The exhaust gas purification catalytic device of claim 8, wherein
- the heat insulator is provided at least by providing the exhaust gas passage with a double tube structure, or by providing a heat insulating layer made of a low thermal conductor on a wall of the exhaust gas passage.

10. The exhaust gas purification catalytic device of claim 5, wherein
- the first catalyst is disposed in an exhaust port of the engine, and the catalytic layer which contains the Pt-loaded silica-alumina and with which the exhaust gas contacts first is formed on a metal substrate.

11. The exhaust gas purification catalytic device of claim 10, wherein
- a heat insulator is provided in the exhaust port upstream of the first catalyst in the flowing direction of the exhaust gas.

12. The exhaust gas purification catalytic device of claim 11, wherein
- the heat insulator is provided at least by providing the exhaust port with a double tube structure, or by providing a heat insulating layer made of a low thermal conductor on a wall of the exhaust port.

13. The exhaust gas purification catalytic device of claim 10, wherein
- the first catalyst further contains Pd as the catalytic metal.

14. The exhaust gas purification catalytic device of claim 10, wherein
- the second catalyst contains Pd and Rh as the catalytic metals.

* * * * *